United States Patent
Bucceri

(10) Patent No.: US 9,689,606 B2
(45) Date of Patent: Jun. 27, 2017

(54) METHOD OF, AND APPARATUS FOR, MAKING FROZEN BEVERAGES, ICE CREAM AND OTHER FROZEN CONFECTIONS

(71) Applicant: Chill Factor Global Pty. Ltd., Chadstone, Victoria (AU)

(72) Inventor: Alfio Bucceri, Hamilton (AU)

(73) Assignee: Chill Factor Global Pty. Ltd., Chadstone, Victoria (AU)

( * ) Notice: Subject to any disclaimer, the term of this patent is extended or adjusted under 35 U.S.C. 154(b) by 16 days.

(21) Appl. No.: 14/374,098

(22) PCT Filed: Feb. 22, 2013

(86) PCT No.: PCT/AU2013/000163
§ 371 (c)(1),
(2) Date: Jul. 23, 2014

(87) PCT Pub. No.: WO2013/123561
PCT Pub. Date: Aug. 29, 2013

(65) Prior Publication Data
US 2015/0253067 A1    Sep. 10, 2015

(30) Foreign Application Priority Data

Feb. 22, 2012   (WO) ................ PCT/AU2012/000169
Jun. 6, 2012    (AU) ................................ 2012902359
(Continued)

(51) Int. Cl.
*F25D 3/08*     (2006.01)
*F25D 31/00*    (2006.01)
(Continued)

(52) U.S. Cl.
CPC ........... *F25D 31/002* (2013.01); *A23G 9/045* (2013.01); *A23G 9/08* (2013.01); *A23G 9/12* (2013.01);
(Continued)

(58) Field of Classification Search
CPC ......... F25D 2331/805; F25D 2331/808; F25D 2303/0841; F25D 3/06; F25D 3/08;
(Continued)

(56) References Cited

U.S. PATENT DOCUMENTS 3,685,507 A    8/1972  Donnelly
4,183,226 A *  1/1980  Moore .............. B65D 81/3883
                                              220/903
(Continued)

FOREIGN PATENT DOCUMENTS

CN    101072511    11/2007
DE    2308515      8/1974
(Continued)

OTHER PUBLICATIONS

International Search Report for International Application No. PCT/AU2013/000163 dated May 21, 2013.
(Continued)

*Primary Examiner* — Orlando E Aviles Bosques
(74) *Attorney, Agent, or Firm* — Carlson, Gaskey & Olds, P.C.

(57) ABSTRACT

A frozen beverage device to convert a liquid beverage into a semi-frozen or frozen form has inner and outer walls forming at least one refrigerant cavity containing a refrigerant material with a freezing point below the freezing point of the liquid, the refrigerant material occupying at least 60% of the volume of the refrigerant cavity. The walls of the device can be squeezed to accelerate the heat transfer from the liquid to the refrigerant material; and the device may be (Continued)

placed in a squeezing apparatus. Where the device is to be disposable, the device can be placed in a flexible sheath or outer container before being squeezed to protect the device and/or insulate the user from the refrigerant material. A freezing spoon or stirrer can be used to assist, or accelerate, the freezing process.

22 Claims, 43 Drawing Sheets

(30) Foreign Application Priority Data

| | | | |
|---|---|---|---|
| Nov. 12, 2012 | (AU) | | 2012904927 |
| Dec. 21, 2012 | (AU) | | 2012905691 |
| Jan. 29, 2013 | (AU) | | 2013900264 |
| Feb. 7, 2013 | (AU) | | 2013900429 |

(51) Int. Cl.

| | |
|---|---|
| *B65D 85/78* | (2006.01) |
| *A47G 19/22* | (2006.01) |
| *A47G 21/00* | (2006.01) |
| *B65D 81/38* | (2006.01) |
| *A23G 9/04* | (2006.01) |
| *A23G 9/08* | (2006.01) |
| *A23G 9/12* | (2006.01) |
| *A23G 9/22* | (2006.01) |

(52) U.S. Cl.
CPC .......... *A23G 9/22* (2013.01); *A47G 19/2288* (2013.01); *A47G 21/007* (2013.01); *B65D 81/3872* (2013.01); *B65D 85/78* (2013.01)

(58) Field of Classification Search
CPC .... F25D 31/006; F25D 31/007; F25D 31/008; F25D 31/002; A47G 2023/0275; A47G 2023/0283; A47G 2023/0291; A47G 23/0313; A47G 23/04; A47G 19/2288; A47G 21/007; A23G 9/12; A23G 9/045; A23G 9/08; A23G 9/22; B65D 81/3872; B65D 85/78; B65D 27/08; B65D 81/3272; B65D 88/16; B65D 88/1606; B65D 88/1612; B65D 88/1618; B65D 88/1625; B65D 88/1631; B65D 88/1643; B65D 88/1656; B65D 90/205
See application file for complete search history.

(56) References Cited

U.S. PATENT DOCUMENTS

| | | | |
|---|---|---|---|
| 4,324,111 A | | 4/1982 | Edwards |
| 4,357,809 A | | 11/1982 | Held et al. |
| 4,723,974 A | | 2/1988 | Ammerman |
| 4,741,176 A | * | 5/1988 | Johnson ................ B65D 75/42 |
| | | | 62/457.4 |
| 4,882,914 A | | 11/1989 | Haines-Keeley et al. |
| 5,235,819 A | | 8/1993 | Bruce |
| 5,243,835 A | | 9/1993 | Padamsee |
| 5,926,508 A | | 7/1999 | Koos et al. |
| 6,082,114 A | | 7/2000 | Leonoff |
| 6,330,808 B1 | | 12/2001 | Kouwenberg et al. |
| 2001/0023595 A1 | | 9/2001 | Kaposi |
| 2003/0024937 A1 | | 2/2003 | Hart |
| 2008/0127656 A1 | | 6/2008 | Bucceri |
| 2009/0120109 A1 | | 5/2009 | Jeuch et al. |
| 2012/0247128 A1 | | 10/2012 | Henry |

FOREIGN PATENT DOCUMENTS

| | | | |
|---|---|---|---|
| EP | 0526928 | A1 | 2/1993 |
| FR | 2558939 | | 8/1985 |
| GB | 1032859 | | 6/1966 |
| GB | 1495668 | | 12/1977 |
| GB | 2297291 | | 7/1996 |
| GB | 2383122 | | 6/2003 |
| JP | S6416559 | | 1/1989 |
| JP | H01182279 | | 7/1989 |
| JP | H06327421 | | 11/1994 |
| JP | H11115972 | A1 | 4/1999 |
| JP | 2000146391 | | 5/2000 |
| JP | 2006-200813 | A | 8/2006 |
| JP | 2009268587 | | 11/2009 |
| JP | 2010042836 | | 2/2010 |
| KR | 2003908450000 | | 7/2005 |
| TW | M383372 | U1 | 7/2010 |
| WO | 96/09507 | | 3/1996 |
| WO | 2006/063401 | | 6/2006 |
| WO | 2006/063401 | A1 | 6/2006 |
| WO | 2009/079721 | | 7/2009 |
| WO | 2009/079721 | A1 | 7/2009 |
| WO | 2012/113025 | | 8/2012 |

OTHER PUBLICATIONS

Aussie Ice Slushy Maker, https://www.youtube.com/watch?v=Y2I8KrBAt6o, Jan. 25, 2012.
Slushy Magic—Official Commerical, https://www.youtube.com/watch?v=oi-3retwNBE, Jun. 24, 2011.

* cited by examiner

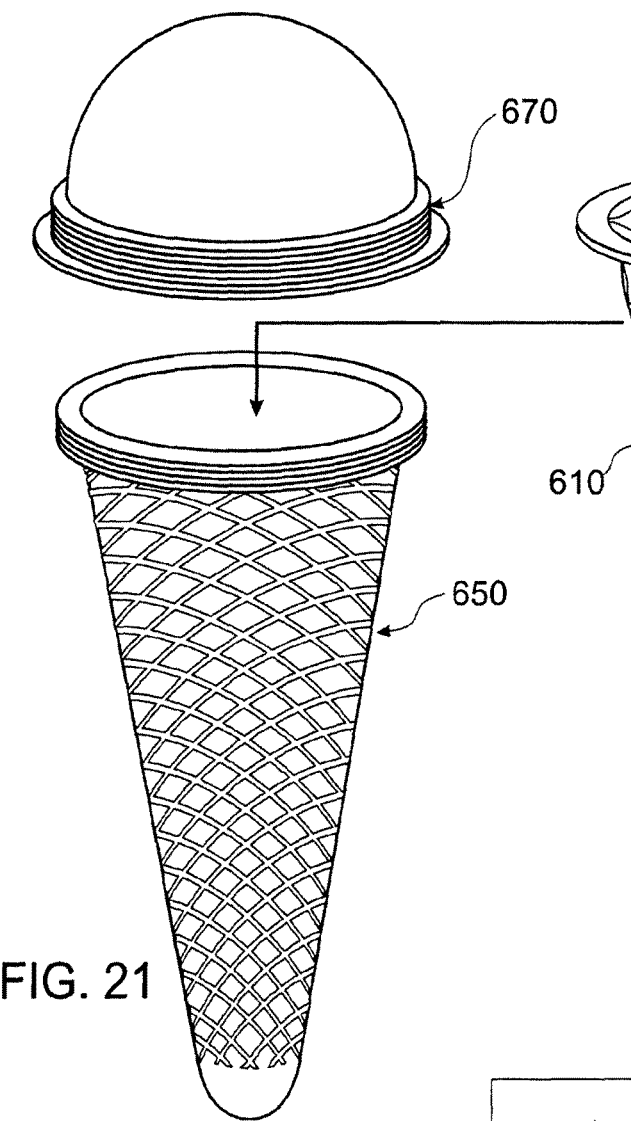
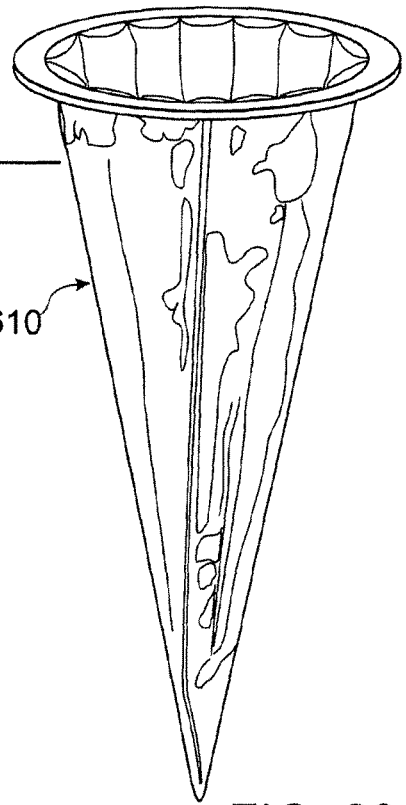
FIG. 21
FIG. 20
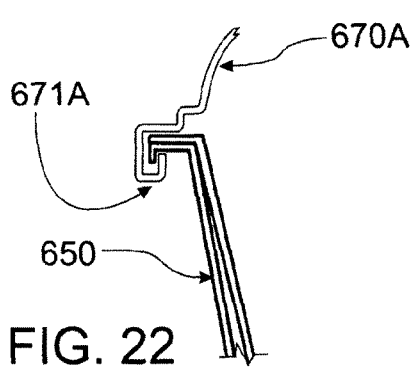
FIG. 22
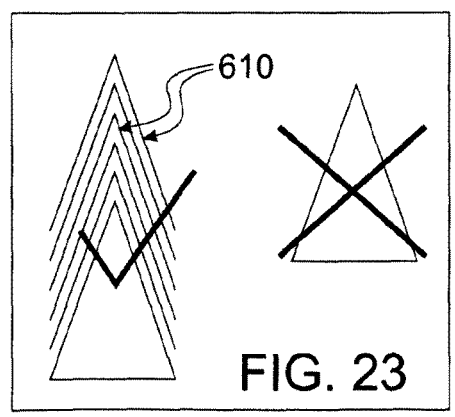
FIG. 23

Prior Art

METHOD OF, AND APPARATUS FOR, MAKING FROZEN BEVERAGES, ICE CREAM AND OTHER FROZEN CONFECTIONS

BACKGROUND OF THE INVENTION

1. Field of the Invention

THIS INVENTION relates to a method of, and apparatus for, making frozen beverages, ice cream and other frozen confections The invention particularly relates, but is not limited to, an improved method and freezing liner for operation of a frozen beverage device; and to methods of producing frozen beverages, ice cream and other frozen confections using the device.

The invention is more particularly suitable for, but not limited to, a device for making frozen beverages or foods in semi-frozen "slurry" or "slushie" form; and to such a frozen beverage device which may be used as a toy or plaything.

2. Definitions

Throughout the specification, the term "frozen" shall be used to also include articles in a "semi-frozen" state.

Throughout the specification, the term "slurry" shall be used to include a mixture of liquid/semi-liquid, liquid/frozen and/or semi-liquid/frozen portions of a liquid (or liquids).

Throughout the specification, the terms "frozen beverages", "frozen confections" and/or "frozen foods" may include, but not be limited to. ice cream, ice confections, frozen yoghurts, snow cones, gelato, jellies, puddings, frozen waters, frozen flavoured waters, frozen fruit juices, frozen fruit drinks, frozen milk, frozen milk-based beverages, frozen-soy based beverages, frozen alcoholic drinks (e.g. spirits or mixed drinks), or like frozen liquids.

Throughout the specification, the term "jelly" may include, but not be limited to: sugar-sweetened jellies, artificially-sweetened jellies, artificially-flavoured jellies, and jellies made from fruit juices, fruit drinks, soft drinks, milk- or soy based dinks, yoghurts, energy drinks, and mixtures of the above.

Throughout the specification, the word "container" may include, but not be limited to, all flexible containers capable of being folded and/or joined and shall include: plastic sheet, such as thermal polyurethane (TPU), polyurethane, polyethylene, polypropylene, polyvinyl chloride, silicone, ethyl vinyl acetate and PET (polyethylene terephthalate); metal sheets, such as aluminium foils and aluminium sheeting; cellulose-based materials, such as cardboard, waterproof paper or paper-sheeting; and mixtures (e.g. laminates) of the above.

The term "container" may also include all packaging designs including: cans, bottles, cups, sealed pillow-packs, cartons, gusseted packs, Quatropak™, blockbottom packs, string packs, sachet packs, Euroslot™ packs, Round Hole Packs and Multi Packs 3. Prior Art NB: The following discussion is by way of background information only, and is not to be considered as a statement of the common general knowledge (CGK) in the area of technology, any where in the world.

For many years, beverage companies have attempted to create frozen beverages that can be sold over-the-counter at corner stores, sporting- and entertainment venues, which may provide self-serve products with flavours that include all forms of canned or bottled beverages.

At present, the products of this type are marketed generally fall into two categories:

1. The first type uses a plastic, cardboard or aluminium container that is frozen by refrigeration; and then consumed after the drink has been taken from the freezer and thawed. The disadvantages of this type of product include that the drink is frozen into a frozen block of ice; the drink takes some time to thaw; and the drink is limited to the type of beverage that can be frozen, which at present is mainly fruit juice.

2. The second type is based on "slurry" machines that dispense frozen beverages (or so-called "slurry'-type drinks), e.g., of well-known beverages such as Coca-Cola®, Pepsi Cola® and Schweppes® Lemonade, into a cup or other container. These drinks are commonly known as Slurpees®, Icees® or Slushies®.

Theses "slurry" machines are very expensive to manufacture and install; are not suitable for, e.g., domestic use; are not suitable for the manufacture of a wide range of "slurry"-style beverages, including alcoholic beverages (such as cocktails); and are limited in the number of flavours (e.g. 2-4) that can be dispensed from a single machine.

International Patent Application PCT/AU2005/001895 (=International Publication WO 2006/063401) (Bucceri, Alfio) disclosed a method of, and apparatus for, converting a liquid in a container to a semi-frozen slurry or to frozen ice particles.

The freezing device was a purposely-designed cup capable of holding a refrigerant between 2 flexible walls; and could be provided in numerous sizes and shapes.

The refrigerant between the walls of the cup consisted of salt and water, or a similar brine-type solution, lowers the freezing temperature of the solution. The refrigerant was placed between the walls, and air was excluded before sealing the two walls of the cup that was formed.

In this way, a vacuum was formed between the walls which allowed for the refrigerant to be disbursed high onto the side walls of the cup or vessel, or other freezing means, and then a beverage was added to be chilled or frozen.

The cup was then subjected to squeezing by the consumer's hands for a pre-determined period of time, and the beverage was quickly chilled, or could be totally or partially frozen. The beverage was then ready for consumption.

It was found that when using that apparatus and method, the refrigerant between the wall cavities would drop by gravity to the bottom of the cup, and create a pressure on the flexible and pliable inner wall.

The inner wall was made from flexible pliable material such as silicon, TPU (thermal polyurethane), PE (polyethylene), EVA (ethylene vinyl acetate), thin-sheeted aluminum, copper foil, or food grade polyurethane- or polyethylene material.

The problem did not affect the working of the apparatus; and during the freezing of the cup and the squeezing of the cup, the problem was not readily noticeable, and the device worked very well and did what it was designed to do during these processes.

In fact, it was the pressure of the liquid refrigerant on the flexible inner wall of the cup that made this a workable and innovative product.

During the use of the apparatus, the double-walled cup containing the refrigerant was frozen in the freezer, and the liquid coolant would fill the total void between the cup walls to ensure that heat transfer occurred to all parts of the inner cup, from the base to the top of the cup.

The refrigerant was distributed in this manner by freezing the cup in an upside down position i.e. turning the cup upside down, when in the freezer, to ensure that the refrigerant was easily and efficiently spread.

Then, when the consumer took the cup from the freezer and filled the cup with a cold liquid and squeezed the sides, the transfer of heat caused the ice crystals that were formed on the inner wall of the apparatus to be dislodged and to float to the top of the cup! It has been shown that cup worked perfectly and efficiently in making a slushy drink in this manner. However, in doing so, there was a problem with the cup that became relevant during the consumption of the beverage by the user.

The problem that occurred is that the melting refrigerant between the inner walls of the cup drops by gravity to the base of the cup, as the refrigerant is converted from ice to liquid and released the cold.

The inner wall of the cup would expand at the base as with the user consumed the frozen beverage and caused the amount of frozen beverage to diminish within the cup.

This caused the top of the flexible inner wall to move inwardly at the top of the cup, while at the same time bulging out at the base of the cup as the liquid refrigerant in the lower side pushed against the inner wall.

The effect of this action was that the perfectly formed inner wall can now resemble a wine-glass shape with the bottom part of the inner wall constricting around the remaining frozen beverage remaining in the cup.

As this is the nature of the flexible inner wall, the result is understandable, and because of the nature of the resilient flexible material it was still possible to manoeuvre the spoon through the constriction to consume and retrieve the remaining e.g. 15% to 20% of the frozen beverage.

Another problem caused by the above described constriction was that the cleaning of the cup could be more difficult due to this constriction and the liquid refrigerant pressure on the base of the inner wall.

International Patent Application PCT7AU2008/001923 (=International Publication WO 2009/079721) (Bucceri, Alfio) disclosed an alternative apparatus, and method, for converting a liquid in a closable container to a semi-frozen slurry or to frozen ice particles, where freezing devices, with thin deformable walls, contain refrigerant to form a thin layer of ice/ice crystals on the deformable walls, the ice crystals being released therefrom due to agitation of the liquid in the container by shaking/rotation and/or squeezing on the container and/or the removable closure.

Experience with the prior art devices described above has identified some limitations with those devices e.g. the frozen beverage may be difficult to remove from the container and/or the freezing period may be too slow to be acceptable to the users.

OBJECTS OF THE PRESENT INVENTION

It is an object of the present invention to overcome, or at least ameliorate, one or more problems with the prior art devices.

Other preferred objects of the present invention will become apparent from the following description.

SUMMARY OF THE PRESENT INVENTION

In one preferred embodiment, the present invention resides in a device for converting a liquid into a semi-frozen or frozen form, including: an outer wall and an inner wall sealably connected together to form at least one refrigerant cavity; and a refrigerant material at least partially filling the at least one refrigerant cavity, the refrigerant material being operable to be cooled below a freezing temperature of the liquid, to at least partially-freeze the liquid to form a semi-frozen slurry and/or frozen particles when the liquid is brought into contact with the inner wall.

Preferably, the outer- and inner-walls are sealed together about a mouth, at an upper end of the device, the mouth being operable to receive the liquid and/or discharge the slurry and/or frozen particles; and the at least one refrigerant cavity extends substantially between the upper end and a lower end of the device.

Preferably, the at least one refrigerant cavity is formed with a series of semi-closed columns which surround the Inner wall of the device (and may have longitudinal axes substantially parallel with a central axis of the device.)

Preferably, the columns are closed and sealed at the top of the device; but left open at the bottom of the device, where the columns meet a base wall of the device.

Preferably, the columns have a substantially semi-circular, triangular, or other convex shapes, inwardly directed towards a freezing compartment in the device, defined by the inner wall, the freezing compartment receiving the liquid to at least partially-frozen. The convex or other shapes of the inner wall increases the surface area of the freezing compartment available for the transfer of heat from the liquid to the refrigerant material in the refrigerant cavity, or cavities, thereby reducing the time to freeze the liquid in the freezing compartment.

Preferably, the outer wall of the device may be manufactured from aluminium, plastics, or any form of composite material that is capable of being squeezed and is flexible for low temperature use. The outer wall can be covered with, or consist of, an insulating material such as foam, rubber, silicone rubber, EVA (ethylene vinyl acetate), etc. so as to provide insulation to the cup.

Preferably, the inner wall of the device may be manufactured from a flexible plastic, flexible aluminium, or flexible composite material. The selected material is preferably: water-potable; flexible at low temperatures; has a high heat transfer capability; is durable and strong; and in a preferred embodiment, is capable of being welded or otherwise joined to the outer wall material. A preferred material for the inner wall is food grade polyethylene, with a thickness as small as 0.1 mm. Other preferred materials include thermal polyurethane (TPU) or EVA (ethylene vinyl acetate).

The at least one refrigerant cavity, including the columns created by the inner and outer walls, is filled with an refrigerant material e.g. antifreeze mix which can include water mixed with salts, sugar, alcohols, propylene glycol, calcium chloride, and/or other known and safe antifreeze products used for this purpose.

Preferably, a peripheral rim is formed around the mouth, with upper portions of the outer- and inner walls being sealed together e.g. by heat-welding, RF-welding (radio frequency welding), sonic-welding, adhesives or other suitable sealing methods.

Preferably, at least one stabilizing ring is provided adjacent to, or forms part of, the peripheral rim, to limit deformation of the mouth when the device is squeezed or otherwise deformed as the liquid is being partially-frozen.

Preferably, the upper portions of the outer- and inner walls are clamped between a pair of the stabilizing rings, which may be clamped or otherwise secured together.

Preferably, at least the inner wall of the device is convergent from the mouth towards the lower end of the device, where the device may be substantially conical in side view.

Preferably, the device has the configuration of a cup, can, cone, or of a box. (The box may be of rectangular, triangular, square, hexagonal or like shape, and may be foldable to a flat-pack configuration.)

For a disposable version of the device, the device may have both the outer and inner walls manufactured from the material(s) for the inner wall hereinbefore described; where the disposable device can be placed in a "squeezable" sheath, or outer cup; where the sheath or outer cup has at least one side wall, manufactured from the material(s) for the outer wall hereinbefore described, to enable a user to flex or squeeze the device within the container.

Preferably, the peripheral rim of the device is secured to a mouth of the sheath or outer cup, which preferably has a peripheral flange.

Preferably, a locking assembly secures the peripheral rim to the peripheral flange, where the locking assembly may incorporate at least one support ring engageable with the peripheral rim or the peripheral flange.

In a second preferred embodiment, the present invention provides a squeezing apparatus (or machine) that can operate automatically to eliminate manual squeezing of the device; and thereby improve the enjoyment of making "slushy" drinks, frozen drinks, ice creams or the like, and/or other known and safe antifreeze products used for this purpose.

Preferably, for the disposable version of the device, the sheath or outer cup may be removable from the squeezing apparatus; or may form a squeezing compartment in the squeezing apparatus, to receive the disposable device (and minimise leakage into the apparatus or machine).

Preferably, the squeezing apparatus has two operational mechanisms; with a squeezing mechanism that squeezes the side walls of the device at intervals of e.g. 1 to 5 seconds; and a turning mechanism at the base that turns the device e.g. 45°-180° between each squeeze. Alternatively, the squeezing apparatus has two squeezing mechanisms, arranged at 90° to each other, and which preferably operate alternately. These mechanisms are preferably located adjacent a socket, or the squeezing compartment, in the squeezing apparatus to receive the device.

The squeezing apparatus may be powered by one or more batteries; or may be connected to an electricity supply; and may be made in many sizes to cater for many different shaped/sized cups.

In a third preferred embodiment, a method of making a frozen product, where the method includes the steps of:
freezing the refrigerant material in the device;
at least partially filling a freezing compartment of the device with a liquid to be frozen;
optionally closing the device with a lid or cover;
placing the device in the squeezing compartment of the squeezing apparatus; and
operating the squeezing apparatus for a time period to assist heat transfer from the liquid to the refrigerant material to enable the liquid to become at least semi-frozen.

Preferably, the liquid includes a cold- or warm-drink; or a mixture of powder and milk and/or water, to produce the frozen product, such as a frozen beverage, frozen confection or frozen food, as hereinbefore defined Preferably, the time period is controlled by a timer, where the timer is set depending on the consistency of the product required; and where the longer the time period, the thicker the consistency of the end product.

Preferably, after e.g. 1 to 5 minutes, depending on the consistency required, the freezing apparatus will stop; and the frozen beverage, jelly, frozen yoghurt, pudding or ice cream will be simply taken from the freezing apparatus and be ready to be consumed.

Preferably, the device (and optional lid) can be washed for re-use; or disposed of if made as a disposable product. For the re-usable device, it can be placed back in the freezer, optionally in an upside down position, for re-use. Preferably, to minimise storage space, the devices can be nested together.

Alternatively, the freezing compartment in the device may be provided with a temporary liner, such as a sheet or bag formed from plastics-material, where the bag can be used for short-term storage of the frozen product.

In an alternative method, the frozen beverages can be produced e.g. in larger-volume batches, using a freezer bag, which may be squeezed in the squeezing apparatus; or be squeezed by hand or other means.

Preferably, the freezer bag has outer and inner walls manufactured of the material(s) as for the inner wall of the device hereinbefore described; and with a refrigeration cavity, including the columns and refrigerant material, as hereinbefore described for the disposable (squeeze) cup. The freezer bag may be considered to be a disposable cup on a larger (e.g. 200%+) scale. (A disposable liner e.g. of 0.1 mm polyethylene sheet (or GLADWRAP®) may be provided for the freezer bag before the freezer bag receives the liquid to be frozen.)

The freezer bag may have a sealable mouth for the freezing compartment therein, where the mouth can be sealed to prevent leakage of the non-aerated/non-carbonated mixture being frozen.

The freezing of the liquid in the device, or freezer bag, may be accelerated by stirring the liquid and/or scraping the inner wall of the device or freezer bag with a freezing spoon or stirrer, the spoon or stirrer having a hollow body at least partially-filled with the refrigerant material hereinbefore described.

Further aspects/embodiments of the present invention will become apparent to the skilled addressee from the following description.

BRIEF DESCRIPTION OF THE DRAWINGS

To enable the invention to be fully understood, and to enable the skilled addressee to put the invention into practice, a number of preferred embodiments will now be described, with reference to the accompanying illustrations, in which:

FIG. 20 is a perspective view of a seventh embodiment of the device;

FIG. 21 is a similar showing a container to receive the seventh embodiment;

FIG. 22 is a schematic view of an alternative method for securing the lid and body of the container of FIG. 21;

FIG. 23 is a schematic view showing a plurality of devices of the seventh embodiment "nested" in a freezer;

FIG. 57 is a top perspective view of a freezer bag for manufacturing frozen beverages or the like;

Figure 1:
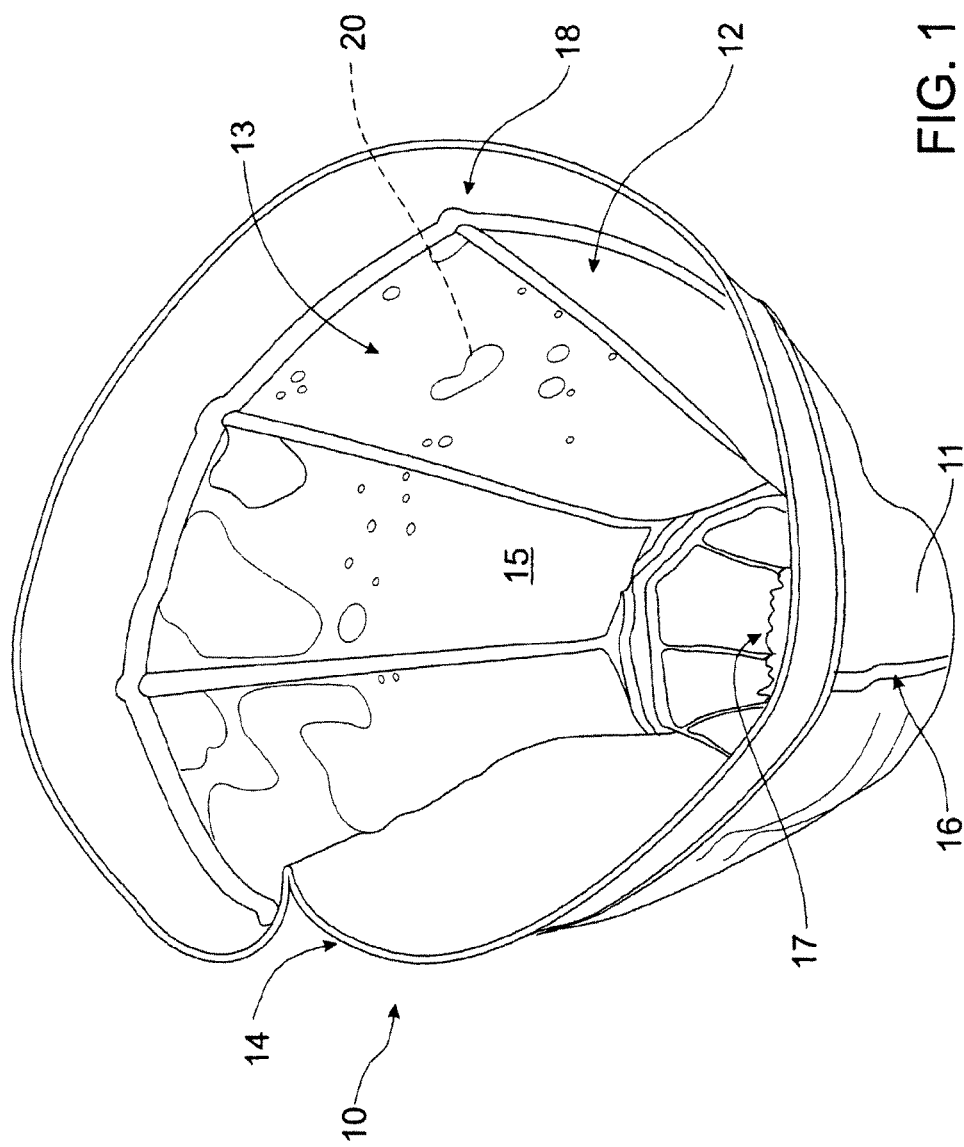
FIGS. 1 and 2 are respective top and side perspective views of a first embodiment of a beverage freezing device in accordance with the present invention.
Figure 3:
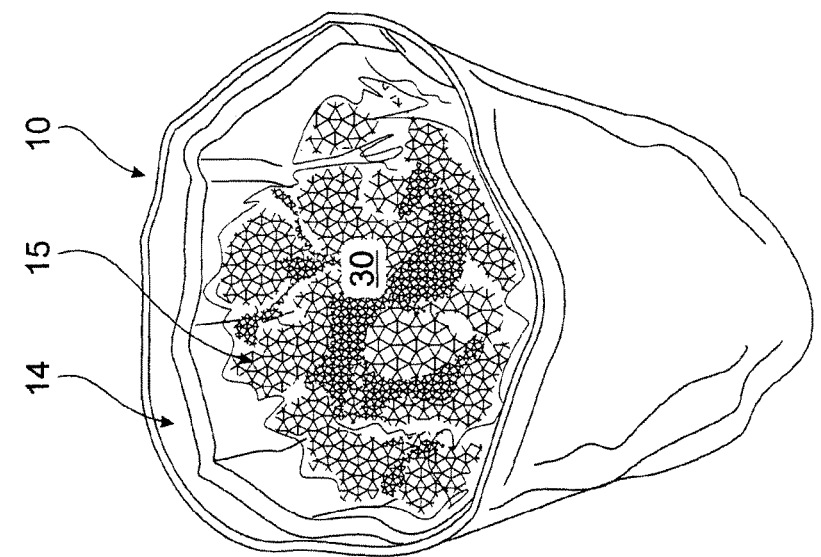
FIG. 3 is a perspective view of the device of FIGS. 1 and 2 containing a semi-frozen liquid.
Figure 2:
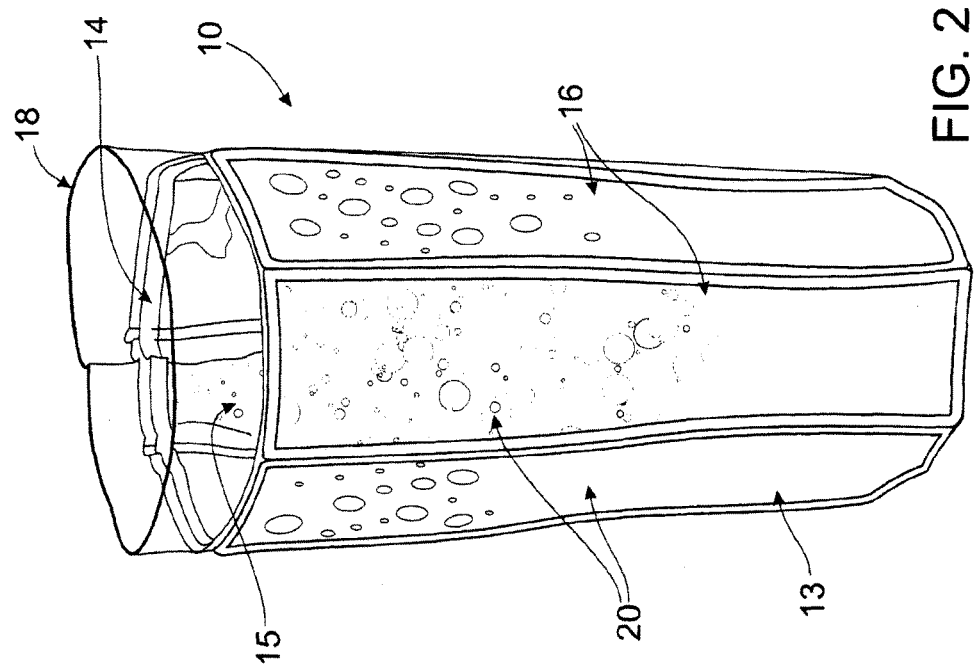

NB: Any notations, comments, dimensions, volumes, ranges, percentages, trade marks, labels or other material on the FIGS, are by way of illustration only, and are not limiting to the scope of the present invention.

DETAILED DESCRIPTION OF THE PREFERRED EMBODIMENTS

In a first embodiment of the freezing device 10 in accordance with the present invention, the device 10 has an outer wall 11 and an inner wall 12 which are e.g. radio frequency welded together to form at least one refrigerant cavity 13.

The walls 11, 12 may be formed from PE (polyethylene) or other suitable plastics-material.

The device 10 has a mouth 14 at the upper end which provides access to the freezing compartment 15 which receives the liquid e.g. a beverage to be at least partially-frozen.

The refrigerant cavity 13 is separated into substantially-vertical "columns" by the welded portions 16 of the walls 11, 12; and extends from just below the mouth 14 to, and extends over, the lower end wall 17. The longitudinal axes of the columns lie substantially parallel with a central axis of the device.

As illustrated, the freezing compartment 15 is at least slightly convergent downwardly from the mouth 14 towards the lower end wall 17.

The refrigerant cavity 13 is partially filled (preferably in the range of 80%-95%) with a refrigerant material 20, such as brine.

Preferably, the volume of the refrigerant material 20 is approximately 60% to 80% of the volume of the liquid to be received in the freezing compartment 15, with the refrigerant material 20 preferably evenly distributed throughout the refrigerant cavity 13. (If preferred, each column may be isolated from its neighboring columns, each column forming a respective refrigerant cavity 13.)

For example, the at least partially-freeze a carbonated beverage with a volume of 375 mL to 400 mL, there may be 320 mL of refrigerant material 20 provided in 40 mL volumes in eight columns in the refrigerant cavity 13.

After being cooled in a refrigerator or freezer, the device 10 is retrieved and the liquid beverage is poured into the freezing compartment 15. On contact with the inner wall 12, the liquid beverage commences being converted to an at least semi-frozen beverage 30, the user squeezing the walls 11, 12 as the freezing occurs. The squeezing assists in causing the semi-frozen beverage particles to be released or moved away from the inner wall 12 to enable heat transfer from the beverage to the refrigerant material 20.

A tubular extension 18, as illustrated in FIG. 1, on the outer wall 11, above the mouth 14, can provide a folding cover to enclose the liquid and/or frozen beverage 30.

Figure 4:
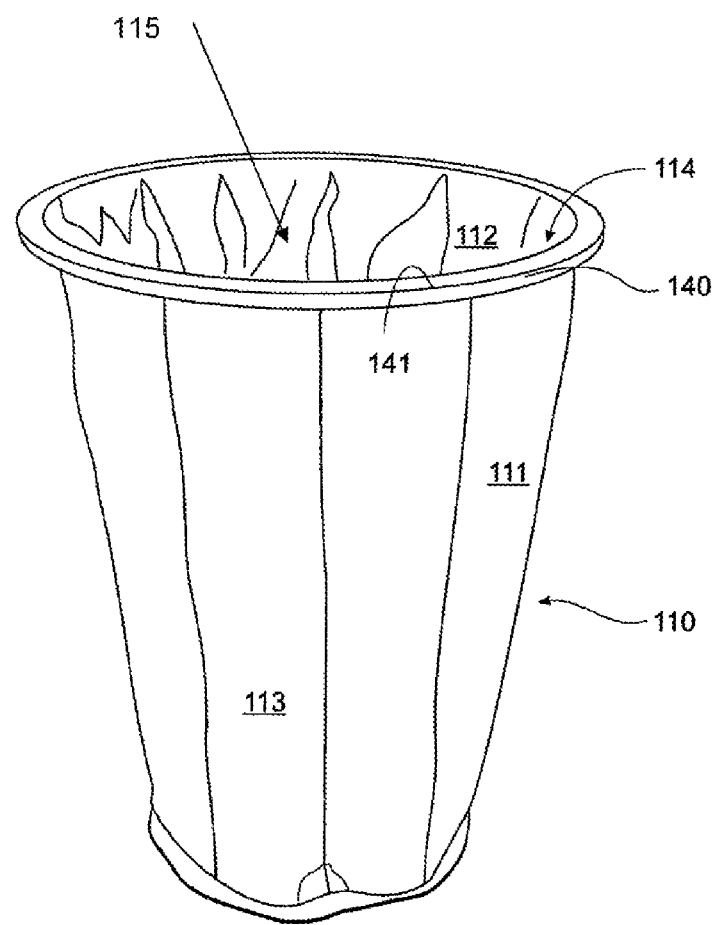
FIG. 4 is a perspective view of a second embodiment of the beverage freezing device.
Figure 5:
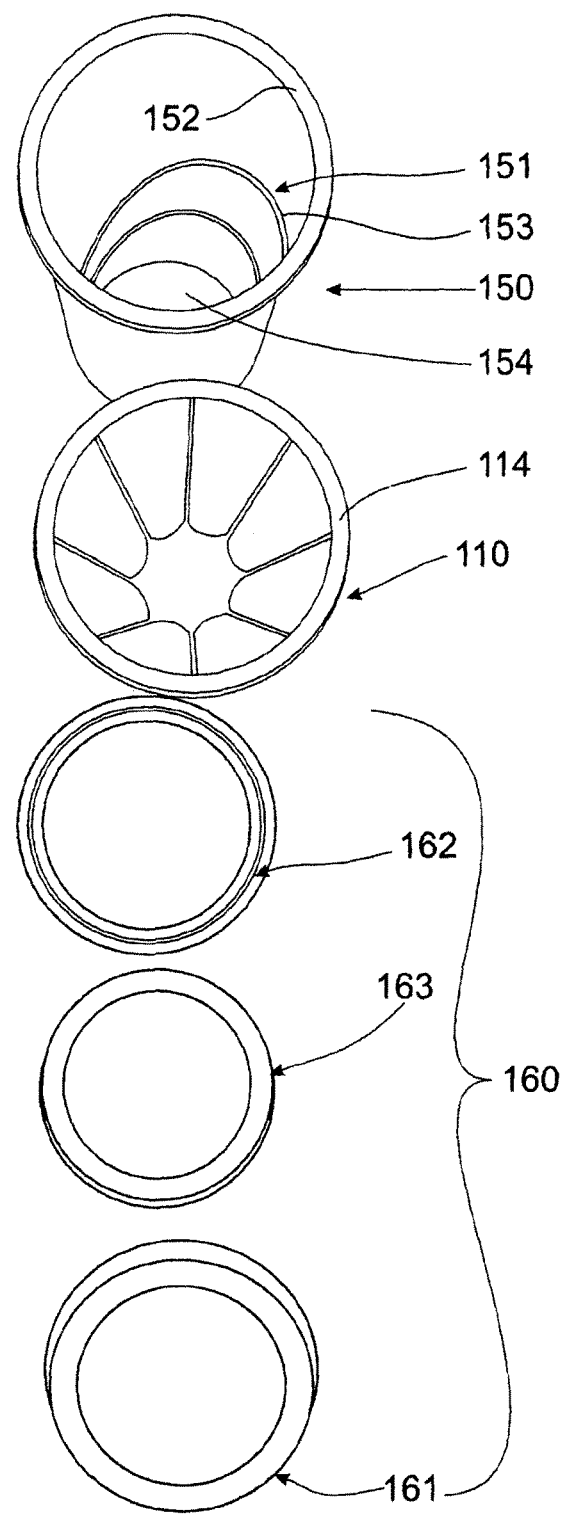
FIGS. 5 to 8 show the steps of combining the freezing device of FIG. 4 with a sheath or outer container.
Figure 6:
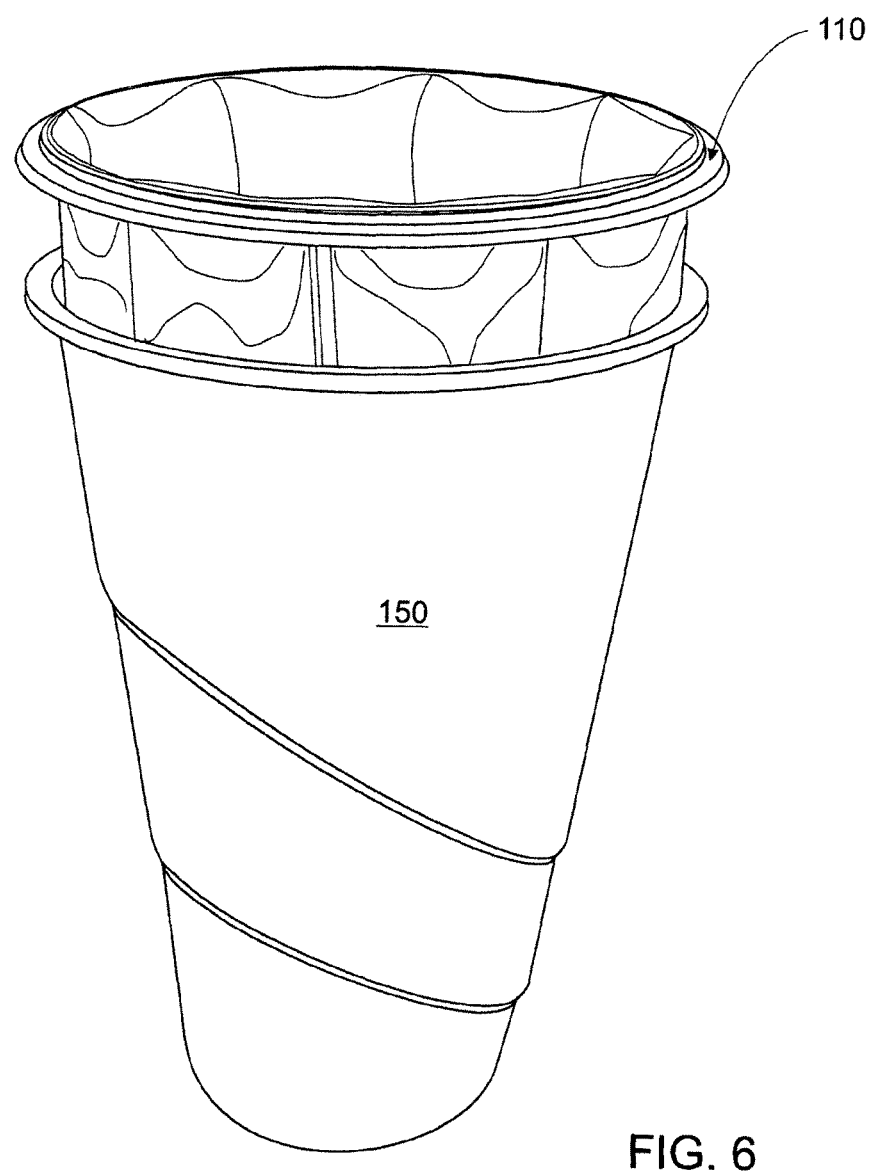
Figure 7:
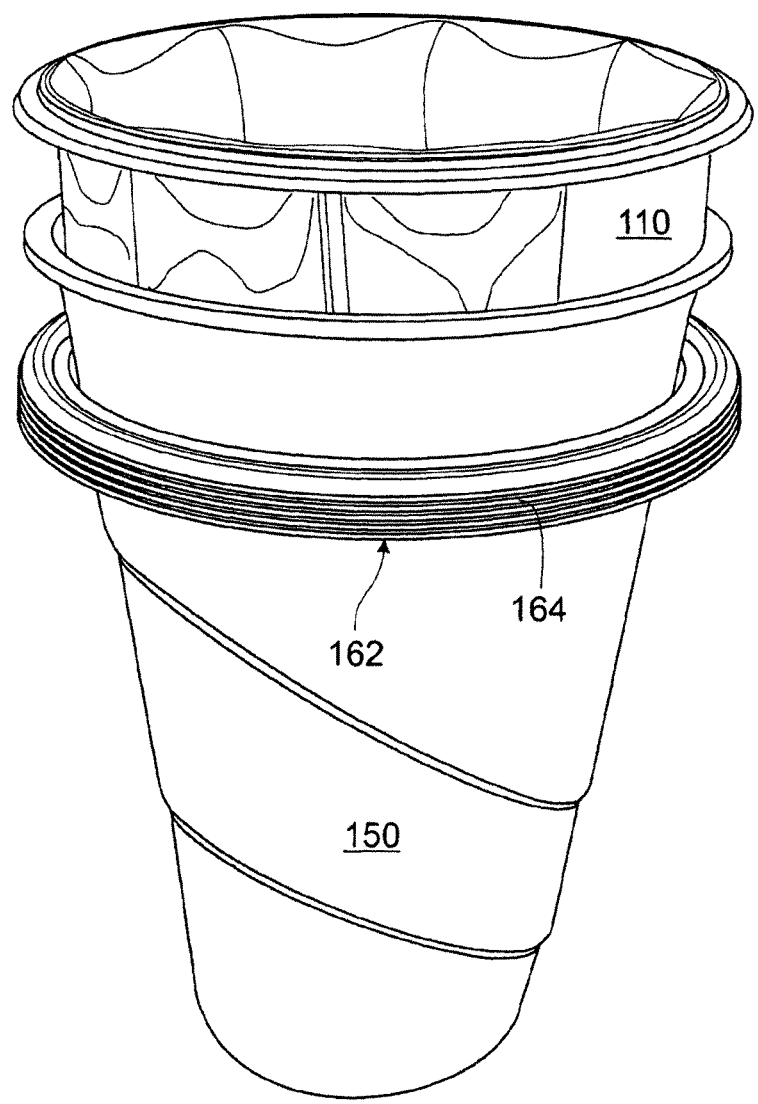

FIG. 4 illustrates a second embodiment, where the device 10 has outer- and inner walls 111, 112, and a refrigerant cavity 113, substantially hereinbefore described for the first embodiment.

A peripheral rim 140 surrounds the mouth 114 and is designed to minimise and deformation, or closing, of the mouth 114 when the device 110 is being squeezed while liquid is being at least partially-frozen in the freezing compartment 115.

The peripheral rim 140 is formed by outwardly-turned upper portions of the outer- and inner walls 111, 112 radio frequency welded together and to a stabilizing ring 141.

As illustrated in FIGS. 5 to 8, the device 110 can be combined with a sheath, cup or outer container 150 e.g. formed of silicone rubber, where the cup 150 has a mouth 151 surrounded by a peripheral flange 152. The cup 150 has a downwardly convergent side wall 153 and a bottom wall 154.

Figure 8:
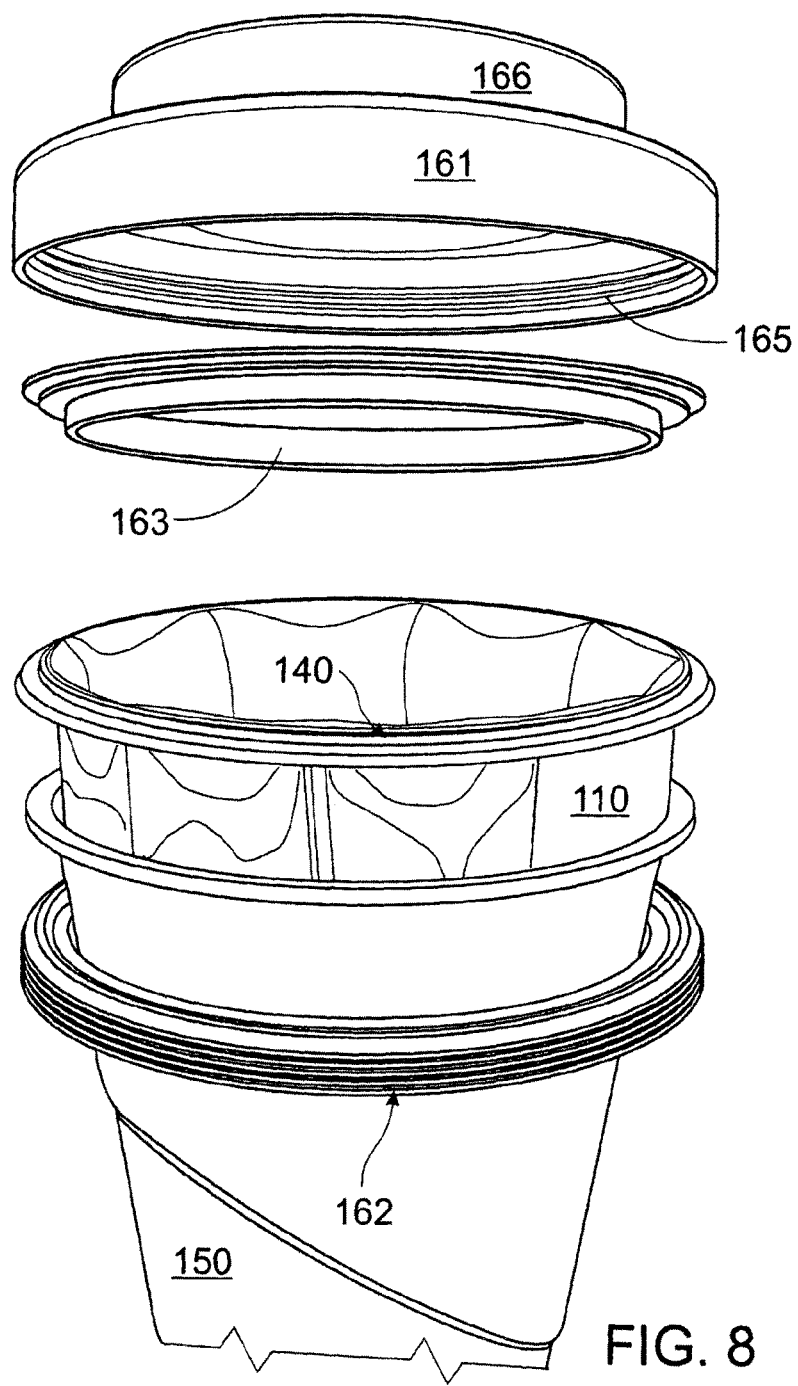
Figure 8A:
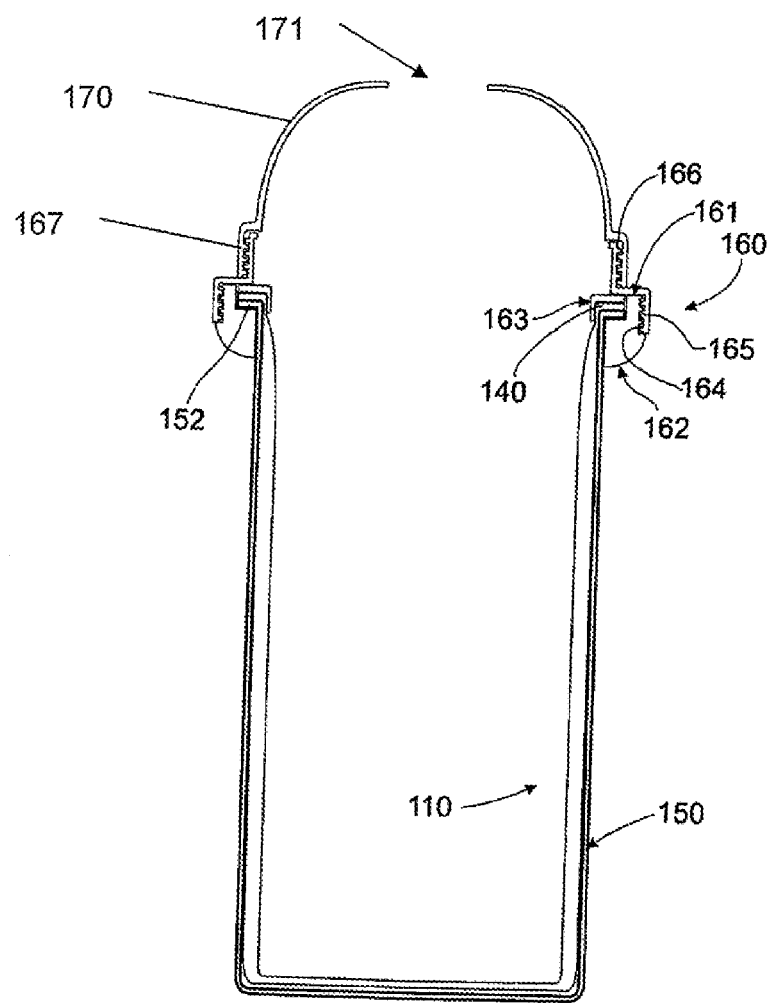
FIG. 8A is sectional side view showing a locking assembly to secure the freezing device in the sheath or outer container.

As illustrated in FIG. 8A, the device 110 is secured in the cup 150 by a locking assembly 160 having top- and bottom rings 161, 162 and an optional third ring 163. The bottom ring 162 has external screw-threads 164 engageable by complementary internal screw-threads 165 on the top ring 161. External screw-threads 166 on the top ring 161 are engaged by internal screw-threads 167 on a cover 170, with a top-opening 171 for access to the frozen beverage in the device 110.

As illustrated, the device 110 is inserted in the mouth 151 of the cup 150 and the peripheral rim 140 engages the peripheral flange 152. The top- and bottom rings 161, 162 are screw-threadably engaged to secure the device 110 in the cup 150.

In certain applications, the third ring 163, which is of substantially inverted-L section, may be engaged in the mouth 114 of the device 110, and be clamped between the peripheral rim 140 and the top ring 161 to provide additional strength opposing deformation of the mouth 114 (and mouth 151) as the side wall 153 of the cup 150 is squeezed after the liquid has been placed in the device 110.

The device 210 of the third embodiment, illustrated in FIGS. 9 to 15, has a generally similar construction to the device 110 of the second embodiment, except that a pair of stabilizing rings 241, 242 are secured together e.g. by sonic welding, to clamp together the upper portions of the outer- and inner walls 211, 212, to provide additional strength to the mouth 214.

Figure 9:
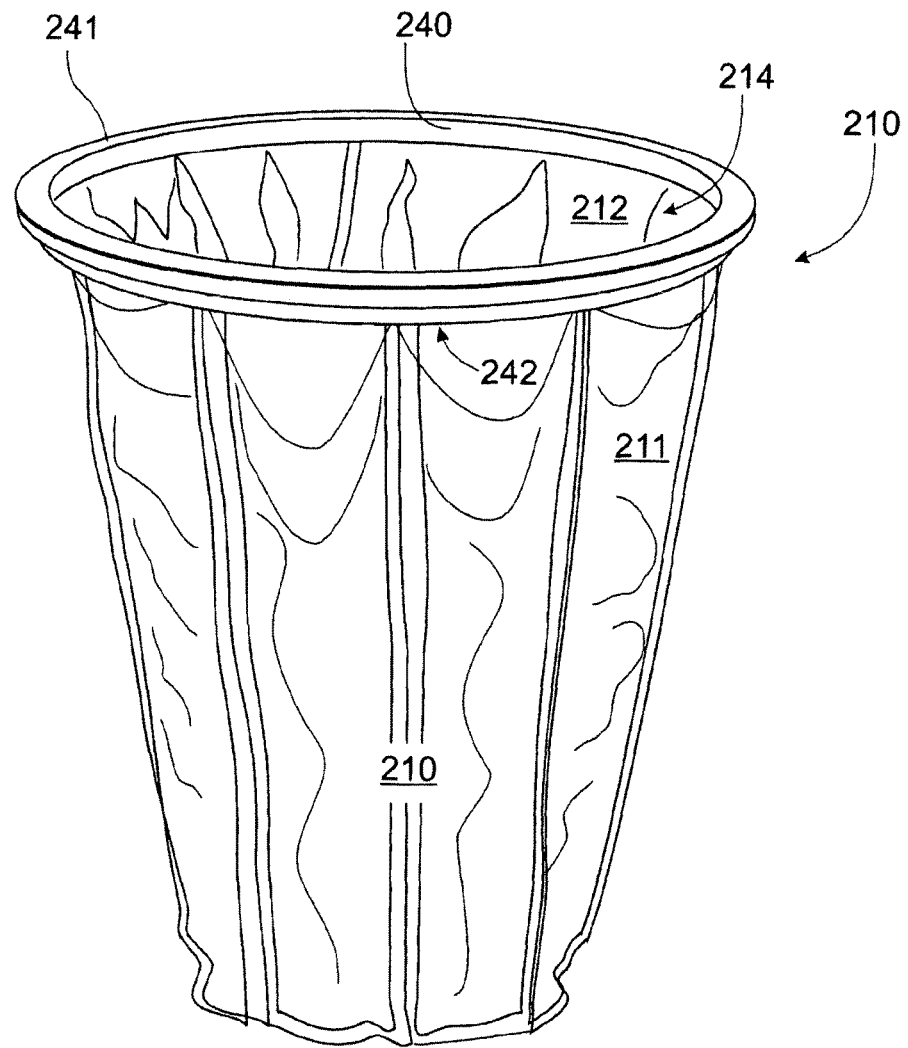
FIGS. 9 and 10 are perspective views of a third embodiment of the freezing device, where the liquid in FIG. 9 is semi- or fully frozen.
Figure 10:
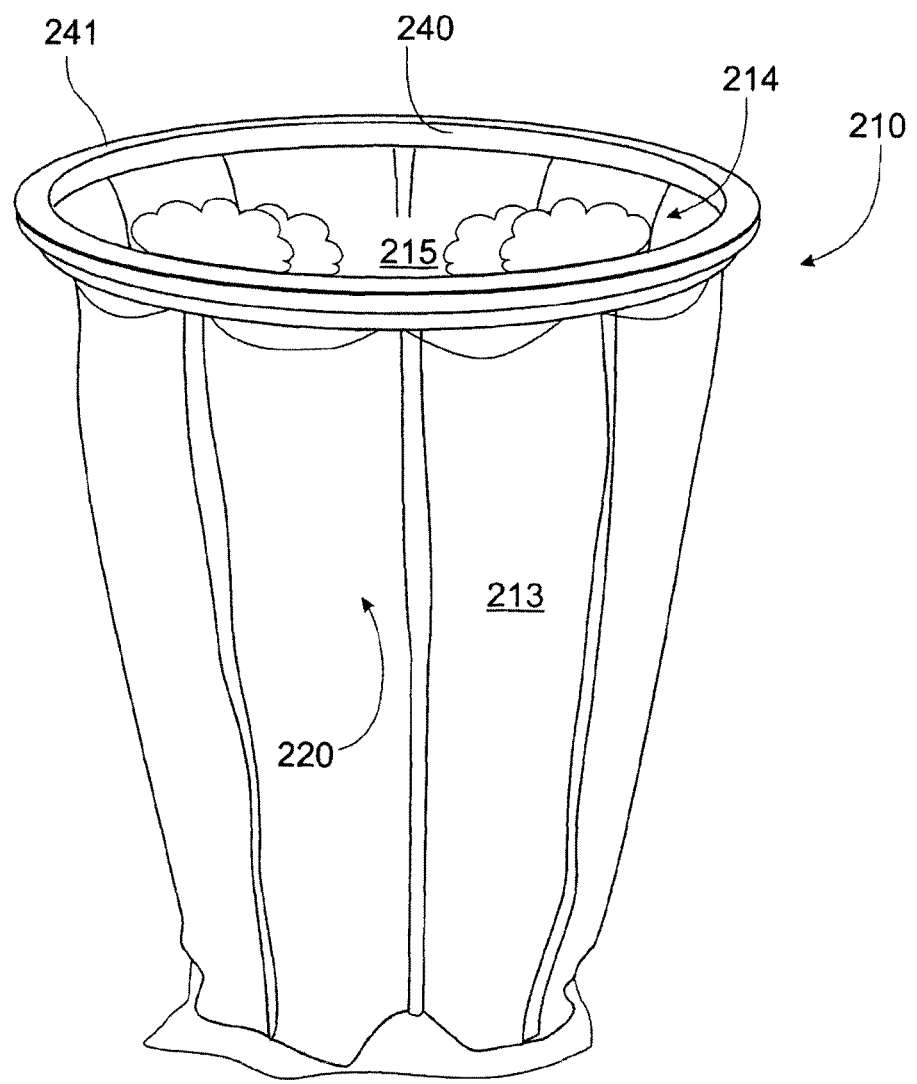
Figure 11:
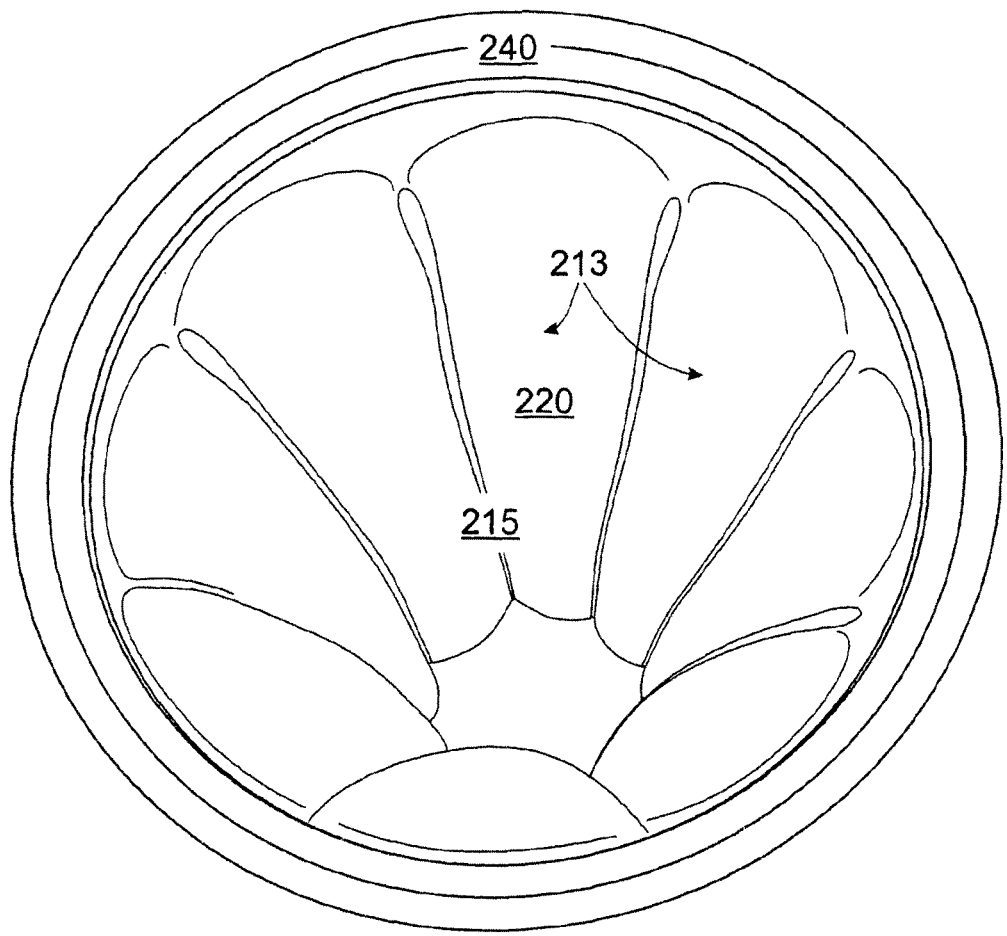
FIG. 11 is a top perspective view of the third embodiment of the freezing device.

FIG. 9 illustrates the device 210 before the refrigerant material has been frozen; while FIGS. 10 and 11 illustrate the device 210 on removal from the freezer, ready for use.

The skilled addressee will particularly note that the mouth 214 is substantially unobstructed, to allow easy removal of the at least partially-frozen liquid from the freezing compartment 215 (see FIG. 10).

Figure 12:
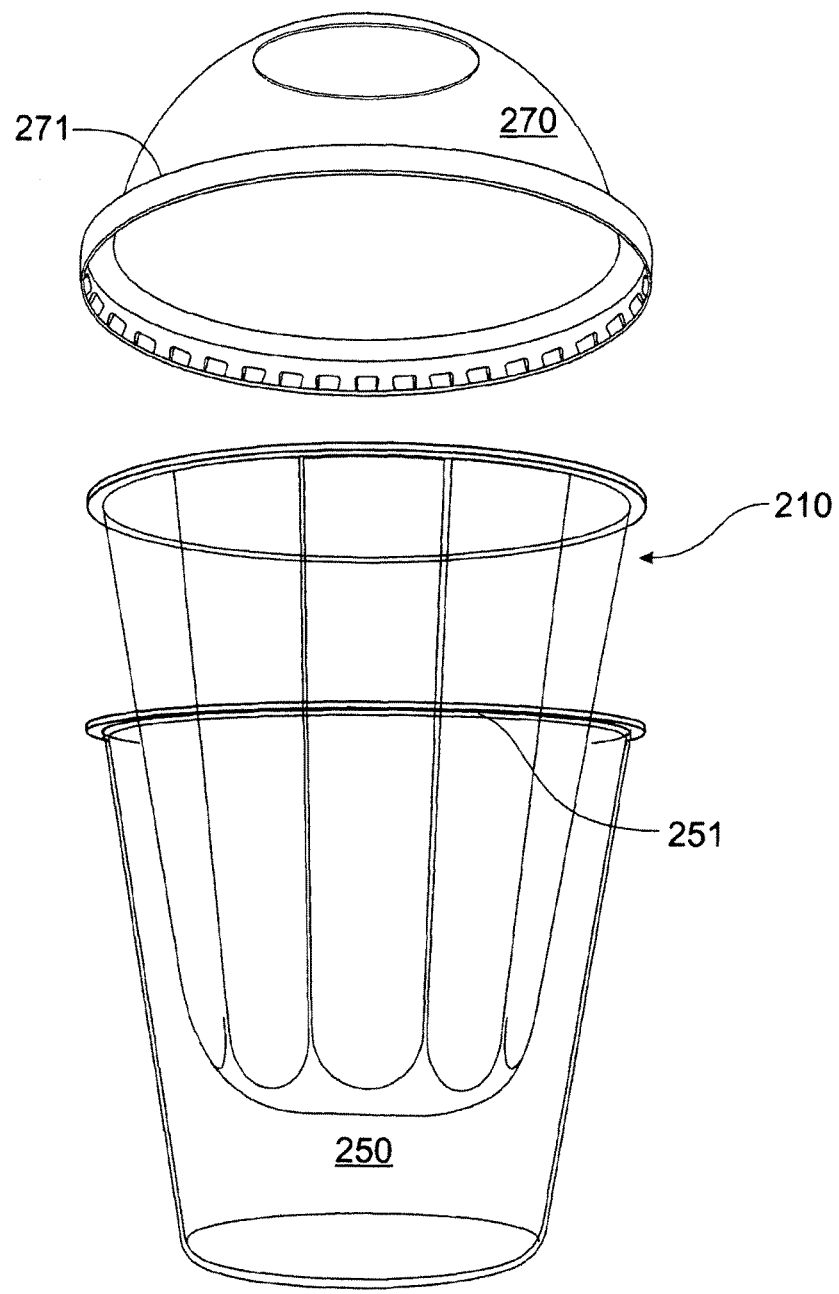
FIGS. 12 and 13 are perspective views of the third embodiment combined with an "off-the-shelf cup or container.
Figure 13:
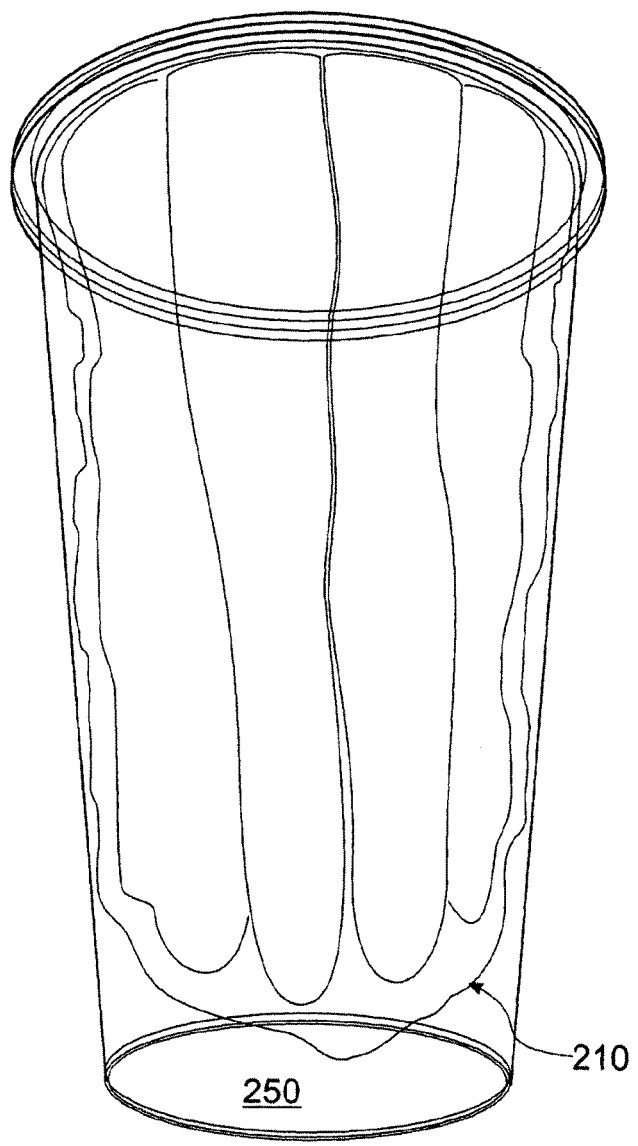

In addition, as will be hereinafter described, the freezing compartment 215 is surrounded by a maximum area of inner wall 212 to provide best heat transfer from the liquid to the refrigerant material 220. FIGS. 12 and 13 illustrate the device 210 combined with a conventional i.e. "off-the-shelf" cup 250 e.g. formed from PET (polyethylene terephthalate). The cup 250 is provided with a cover 270, which may have a central hole to enable access to the at least-partially frozen liquid via a spoon (e.g. of the type illustrated in FIG. 16.)

The peripheral rim 240 is secured between the peripheral flange 251 on the cup 250 and an annular wall 271 on the cover 270; where the cup 250 and cover 270 may screw-threadably, welded, clamped or otherwise secured together.

Figure 14:
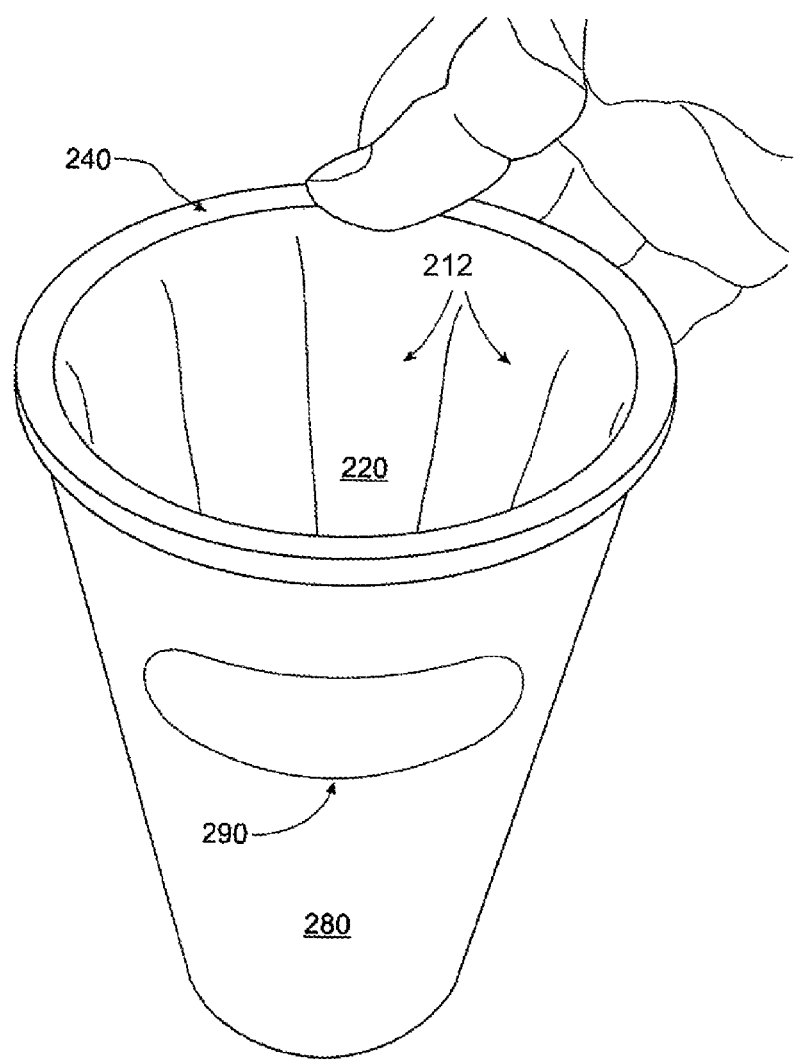
FIGS. 14 and 15 are similar views showing the third embodiment combined with a disposable cup or container.
Figure 15:
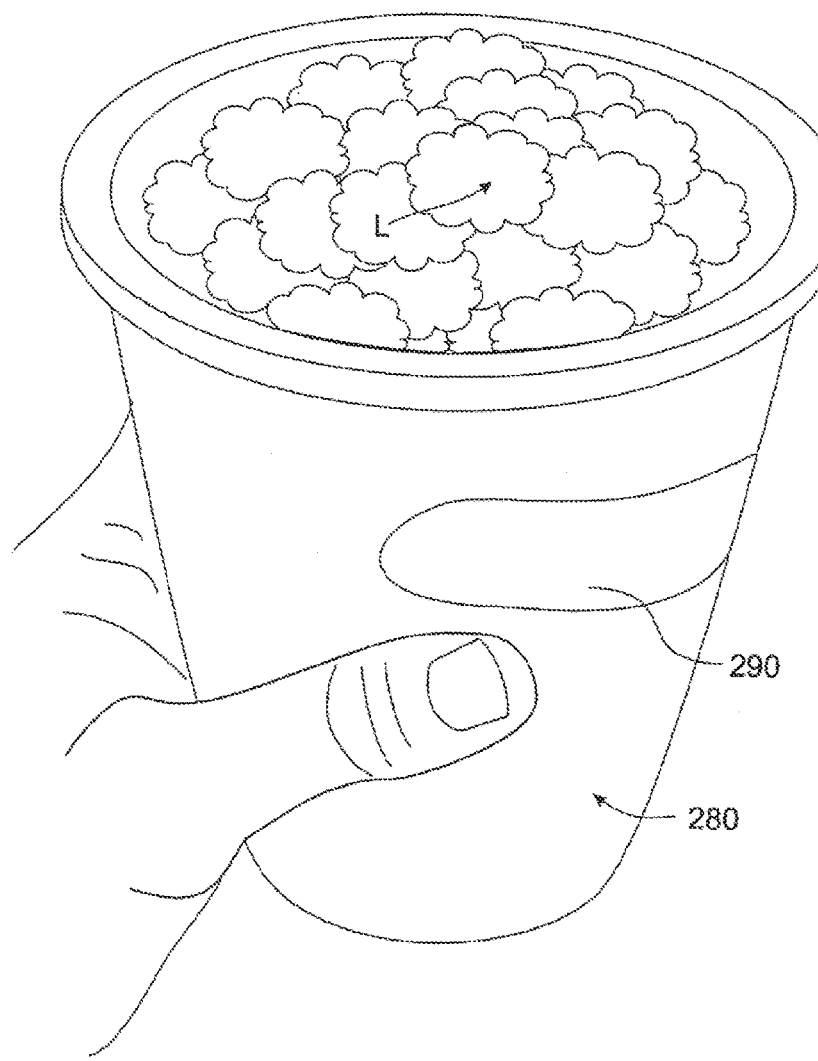

FIGS. 14 and 15 illustrate the device 210 combined with a disposable cup 280, where a paper- or plastics label 290 is placed in the cavity defined between the device 210 and the side wall of the cup 280.

In FIG. 15, the liquid L is able to be retained within the device combined with the disposable cup 280 by a removable cover (not shown).

Figure 16:
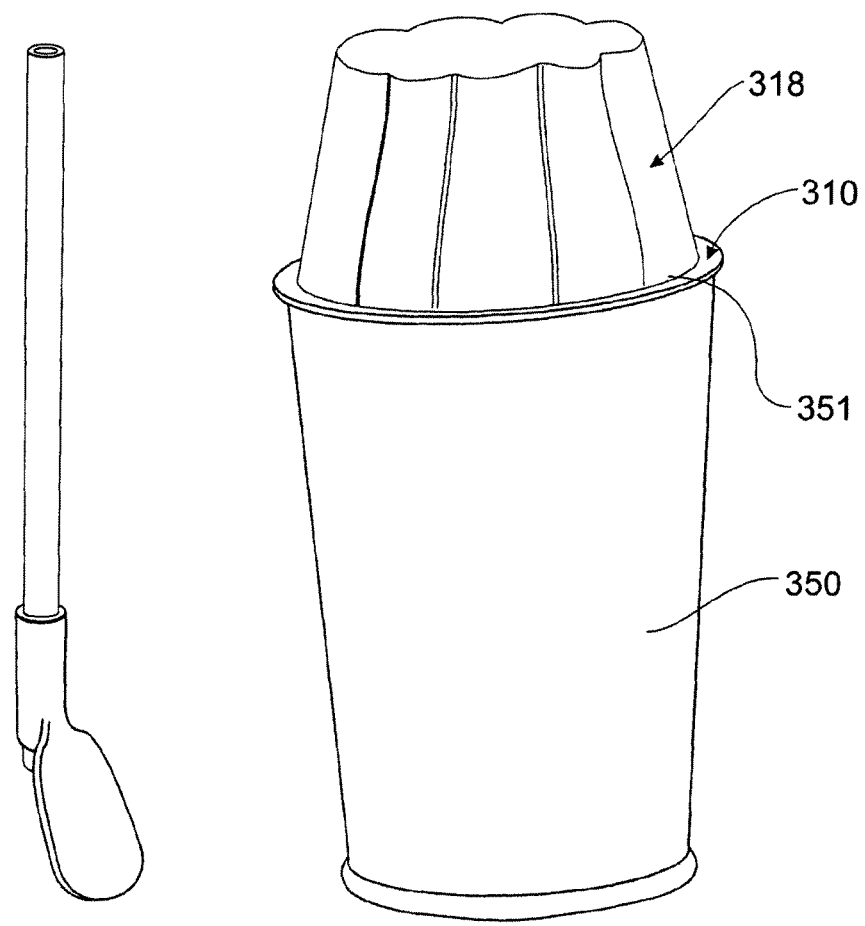
FIG. 16 is a perspective view of a fourth embodiment of the device in a disposable container.

FIG. 16 illustrates a fourth embodiment where the device 310 is welded into a disposable cup 350. The mouth of the device is welded to the mouth 351 of the cup 350 and has a tubular extension 318 which may be folded out, as illustrated, or folded in e.g. to protect and/or retain the slurry within the device 310.

Figure 17:
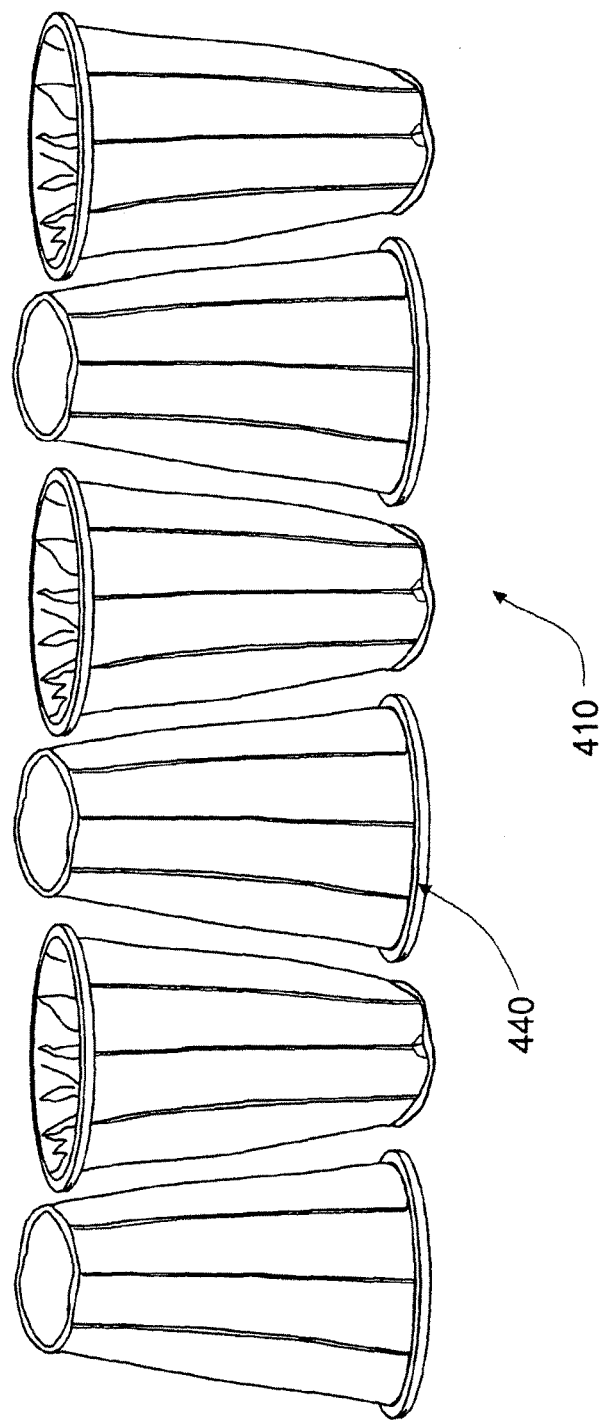
FIG. 17 is a perspective view of a plurality of fifth embodiments of the device.

FIG. 17 illustrates a fifth embodiment of the device 410, which may also be used with the cup 350, the peripheral rim 440 being welded or otherwise secured to the peripheral flange 351 on cup 350.

The devices illustrated in FIGS. 1 to 16 are of "substantially cylindrical" configuration, with preferably a small degree of taper downwardly from the respective mouths.

Figure 18:
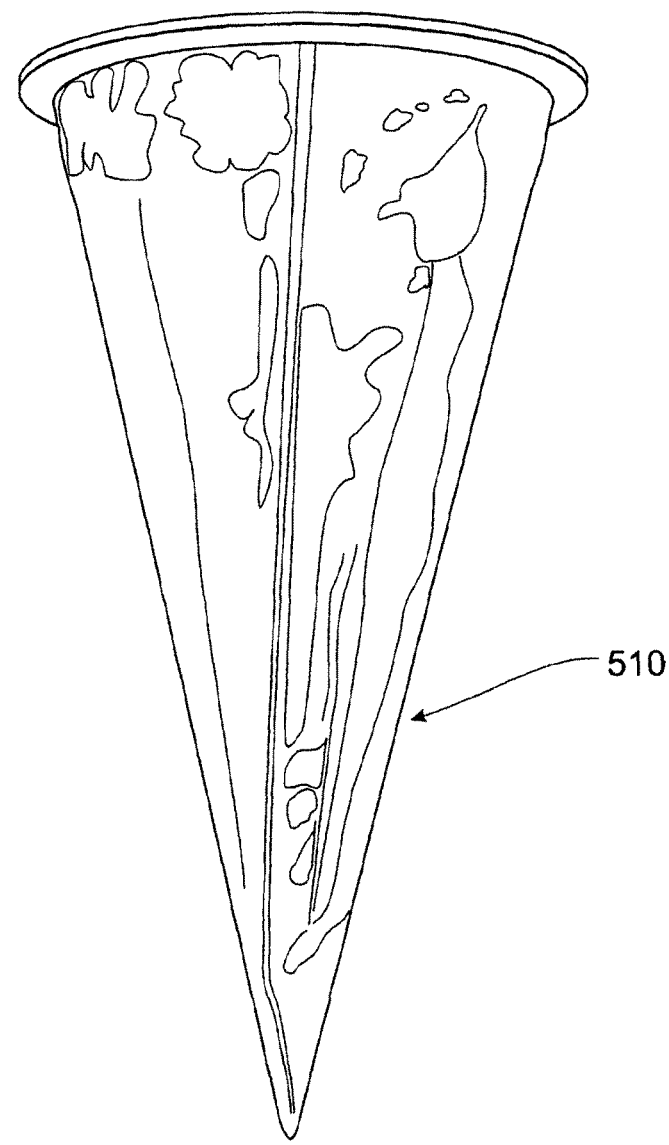
FIG. 18 is a perspective view of a sixth embodiment of the device.
Figure 19:
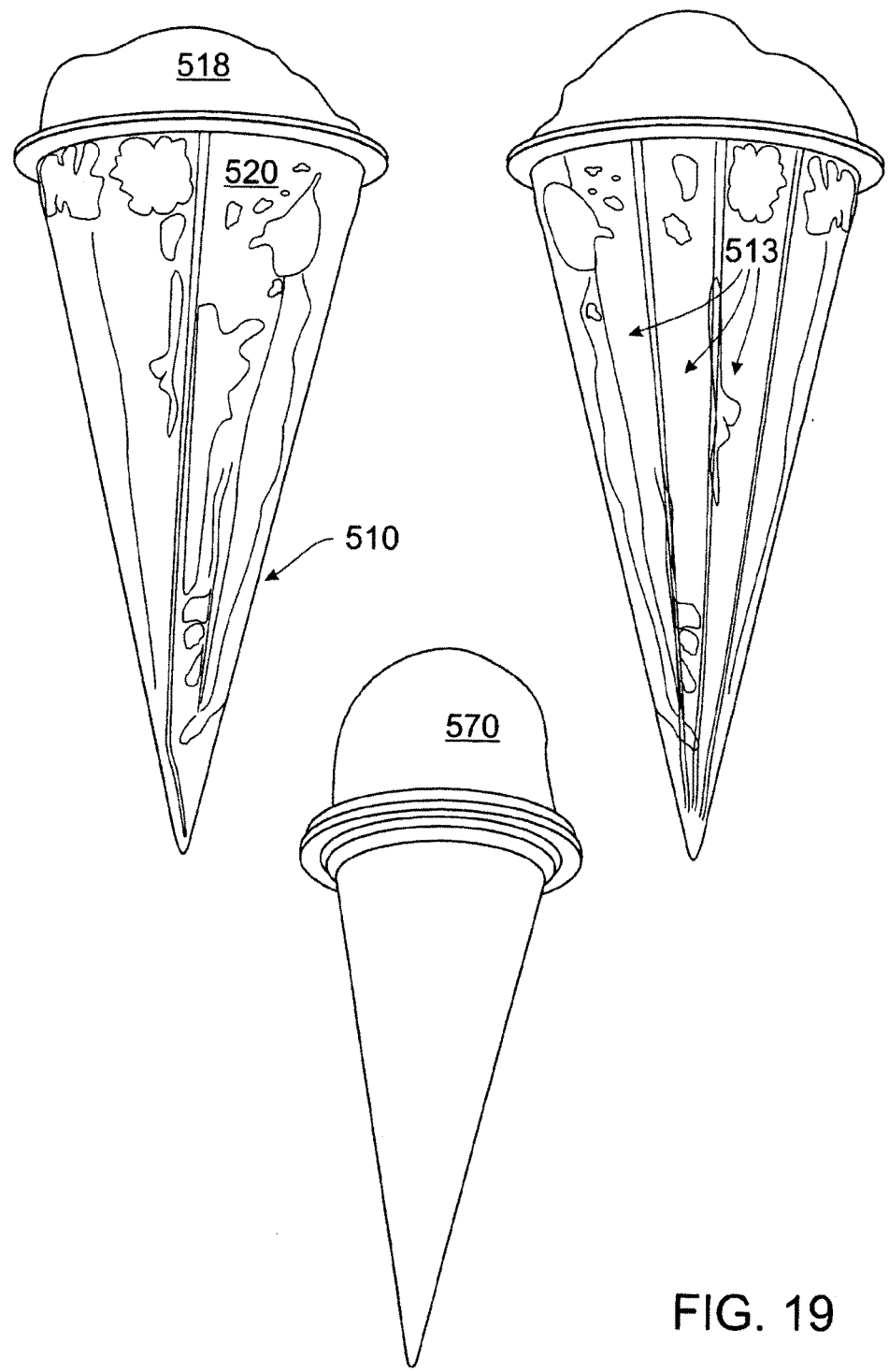
FIG. 19 is a perspective view of the sixth embodiment combined with a conical container for ices or ice cream.

FIGS. 18 and 19 illustrate a sixth embodiment where the device 510 is of "substantially conical" configuration.

This device 510 is particularly suitable for producing ice cream or frozen ices from suitable liquid mixes.

As illustrated, the device 510 may have a foldable extension 518 or be closed by a cover 570.

In this device 510, each of the refrigerant cavities 513 are downwardly tapered, ensuring most of the refrigerant material 520 surrounds the portion of the freezing chamber, which contains the bulk of the liquid mix (or water) to be frozen.

The device 610 of the seventh embodiment illustrated in FIG. 20 is similar to the device 510, and may be disposable or reusable.

As illustrated in FIG. 23, the devices 610 may be "nested" together in a freezer (or in storage).

The device 610 may be used with a disposable container 650, fitted with a screw-threaded cover 670, as illustrated in FIG. 21; or an alternative cover 670A, with a peripheral lip flange 671 A, as illustrated in FIG. 22, a can engage the container 650 to retain the device 610 within the container 650.

Figure 24:
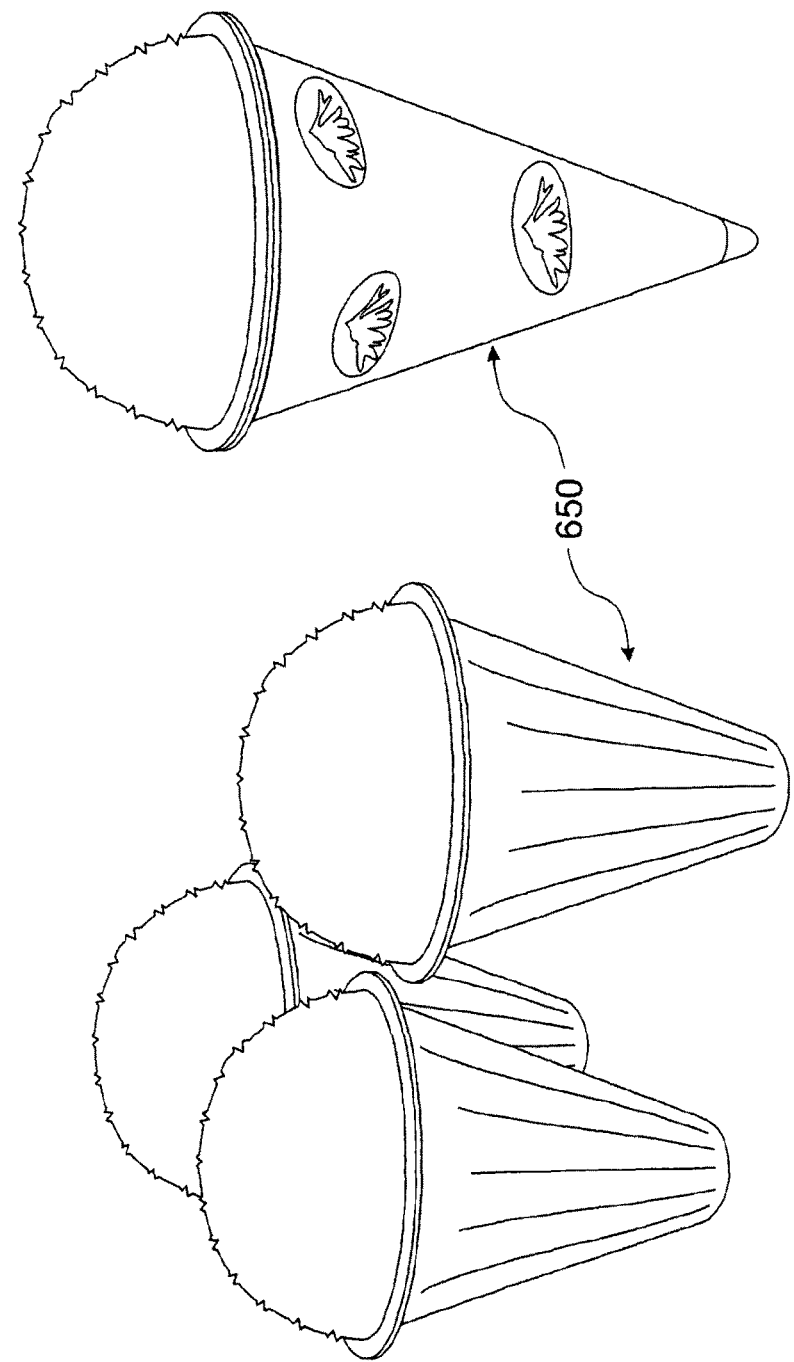
FIG. 24 is a perspective view of frozen ices made using the container and freezing devices of FIGS. 21 and 20, respectively.

FIG. 24 illustrates frozen ices/frozen confections made using the device 610 and container 650 of FIGS. 21 and 20, respectively.

Figure 25:
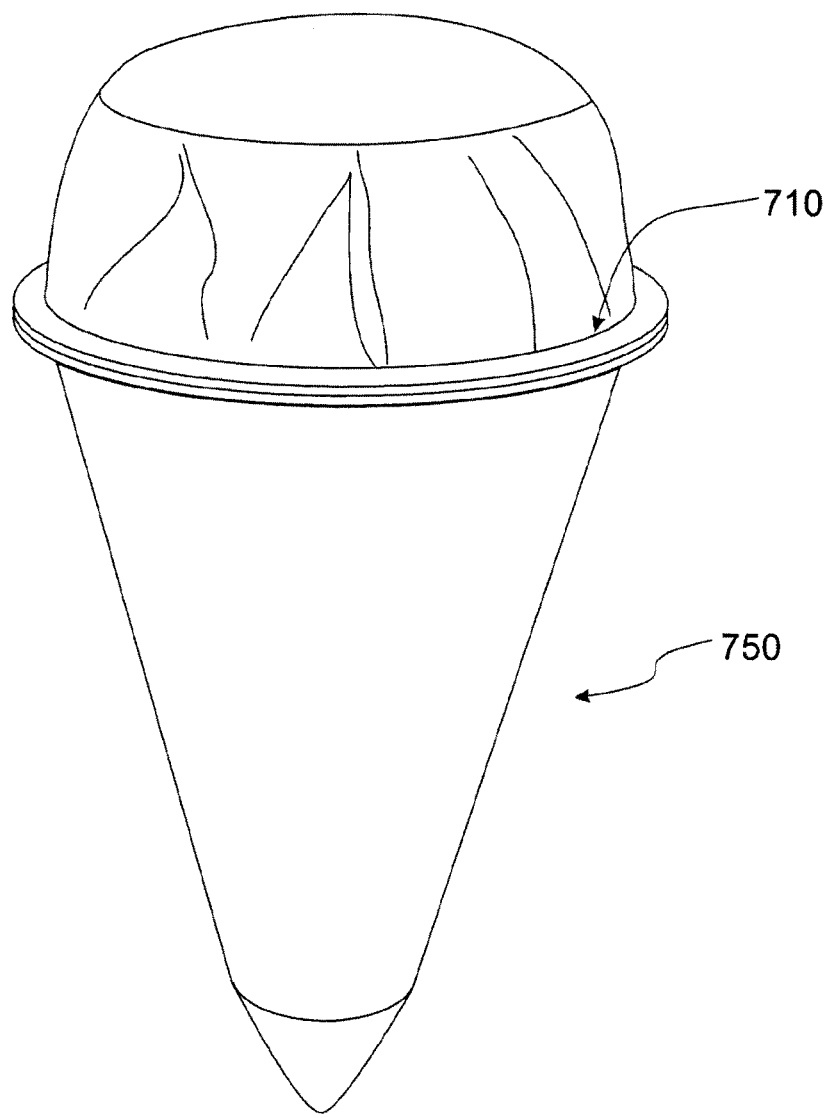
FIG. 25 is a perspective view of a combination of a container with an eighth embodiment of the device.

FIG. 25 illustrates a container 750 provided with an eighth embodiment of the device 710, where the device 710 is welded to the container 750 in the manner hereinbefore described with reference to FIG. 16.

A small tap may be provided at the bottom of the container 750 to drain off any unfrozen liquid within the device 710. [0 06] The advantages of the present invention over the PRIOR ART will now be described with reference to FIGS. 26 to 29B.

Figure 26:
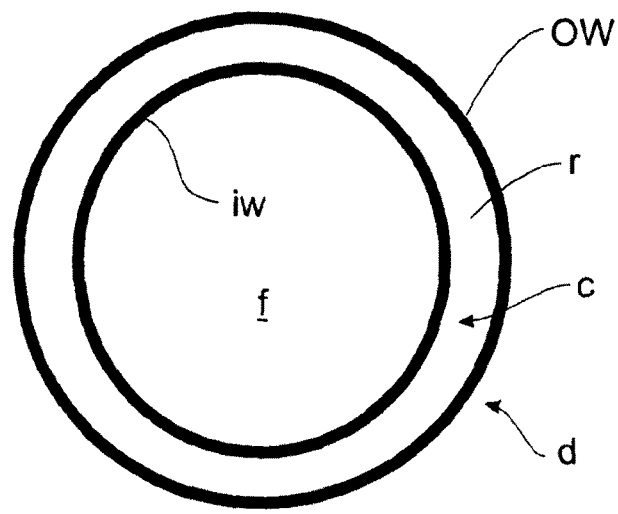
FIG. 26 is a schematic top plan view of a PRIOR ART freezing device.
Figure 27:
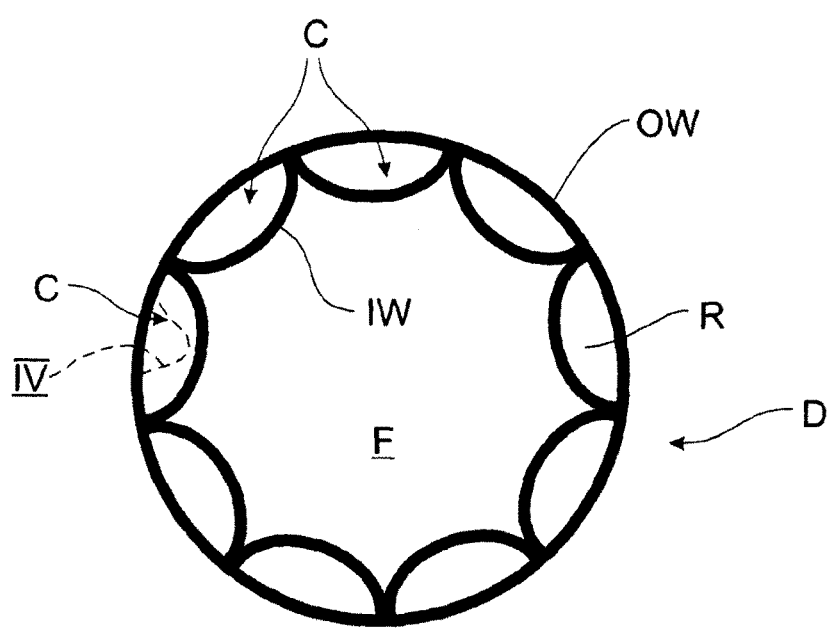
FIG. 27 is a similar view of an embodiment of the present invention.
Figure 28A:
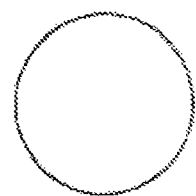
FIG. 28A is a top plan view of a PRIOR ART device.
Figure 28B:
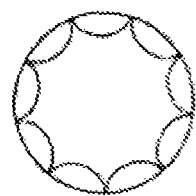
FIG. 28B is a top plan view of an embodiment of the present invention.
Figure 29A:
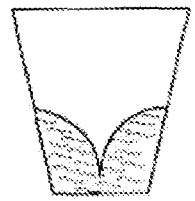
FIGS. 29A and 29B illustrate the increased wall area for heat transfer from the liquid in the freezing device.
Figure 29A:
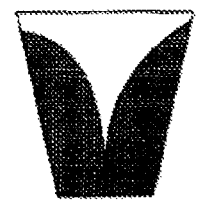
Figure 29B:
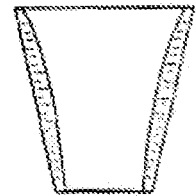
Figure 29B:
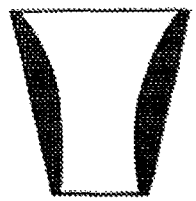
Figure 30:
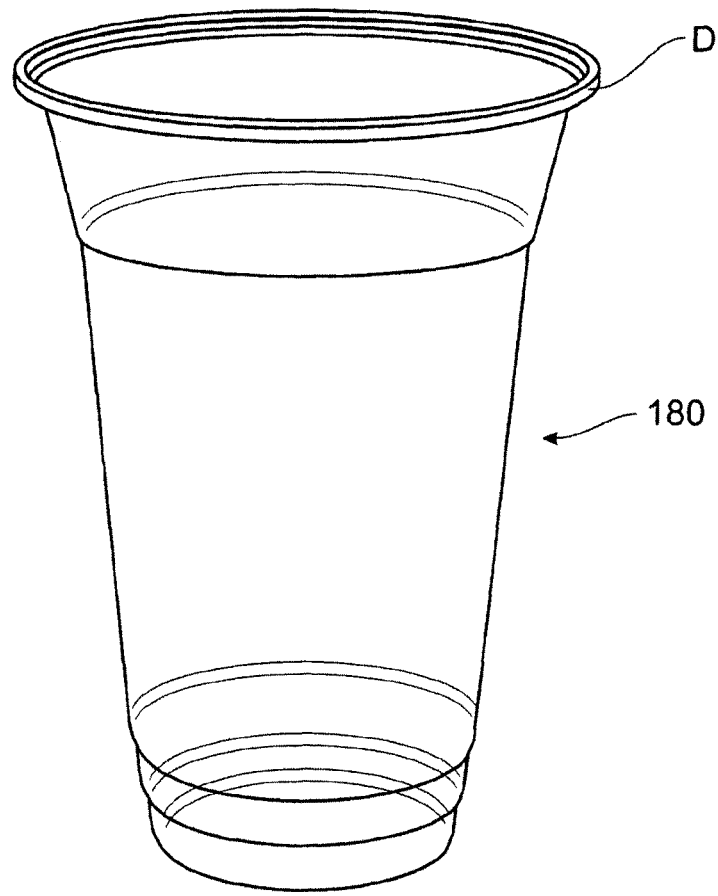
FIG. 30 is a perspective view of a disposable freezing device provided with a disposable liner of plastics sheet.

As illustrated in FIG. 26, the saline solution or other refrigerant material, r in the PRIOR ART device d is provided within the refrigerant cavity c between the outer- and inner walls ow, iw.

In the present invention, the device D has the refrigerant material R in the pluralities of refrigerant cavities C about the freezing chamber F. The refrigerant cavities C extend into the freezing chamber F, where the inner wall IW can have a semi-circular, substantially-triangular (as shown in dashed lines), or other convex configuration.

The advantages of the present invention over the PRIOR ART include (but are not limited to):

a) faster freezing of the liquid e.g. by up to 4 times, due to the increased effective surface area in contact with the liquid;

b) the refrigerant material extends substantially the full height of the freezing chamber;

c) the mouth of the device is not restricted by the inward collapse of the inner wall when the refrigerant is added to the refrigerant cavities;

d) the actual volume of the freezing chamber is maintained at a maximum, so that more liquid can be placed in the device, and frozen, each operating cycle;

e) the semi-frozen slurry can be more easily removed for consumption, as the freezing chamber is not constricted by the inner wall adopting an "hour-glass" shape due to gravity;

f) the device is easier to clean;

g) the device is easier to use;

h) the device can be used with disposable or "off-the-shelf" containers or cups;

i) the device can be manufactured at a cost making it a disposable item itself, or can be manufactured for re-use many times;

j) the device and/or the cup or container can be produced from a wide range of plastics- or rubber materials, metal (e.g. aluminium) foils, or other flexible heat-transferable materials, including those described above with respect to the Prior Art devices; and the cups may even be made from materials such as paper or cardboard;

k) the device can be provided to be fitted to, or be integral with, the cup or container; and l) the placement of the device in the freezer and/or the orientation of the device as the liquid is being frozen, is not critical, as the refrigerant material will always be substantially evenly distributed about the freezing chamber, for maximum heat transfer.

After the freezing device is used each time, it must be cleaned. To overcome this problem, a temporary liner 180, formed of thin plastics-sheet, e.g. sold under the GLAD WRAP®, can be fitted into the freezing device D, thereby keeping the liquid out of contact with the wall of the freezing compartment; and the liner 180 may be used as temporary storage of the frozen beverage for later consumption.

To improve the freezing rate of the liquid in the freezing device, a spoon or stirrer, examples of which will be hereinafter described with reference to FIGS. 31 to 39D, may be used. The spoon or stirrer provides an additional source of refrigerant material, while assisting in dislodging the frozen particles from the wall(s) of the freezing compartment to allow fresh liquid to contact the wall(s).

A PRIOR ART machine has enabled the manufacture of ice cream, or like products, using two cup-like vessels having rigid (e.g. stainless steel) walls. The first vessel is filled with an ice cube/rock salt/water mix to produce brine with a freezing point below 0° C.; and the second vessel, containing the liquid mixture to be frozen, is inserted on the top of the first vessel to contact the brine. The second vessel is shaken or scraped by a spoon, and the resultant frozen slurry formed on the inner surface of the wall of the rigid second vessel is scraped off as the frozen product e.g. ice cream. This machine is complicated to operate, as it requires a precise mixture of ice/rock salt/water to produce an effective brine; and can only produce a very small volume of frozen product each operating cycle.

Where the volume of liquid to be frozen is small, the spoon or stirrer may act as the freezing device itself. In this embodiment, the frozen beverage will form on the spoon or stirrer and can be consumed directly therefrom. This method is possible with any vessel or container which can hold a liquid.

As will be described in more detail, the spoon or stirrer can come in many shapes and/or sizes; and preferably includes an insulated handle.

Figure 31:
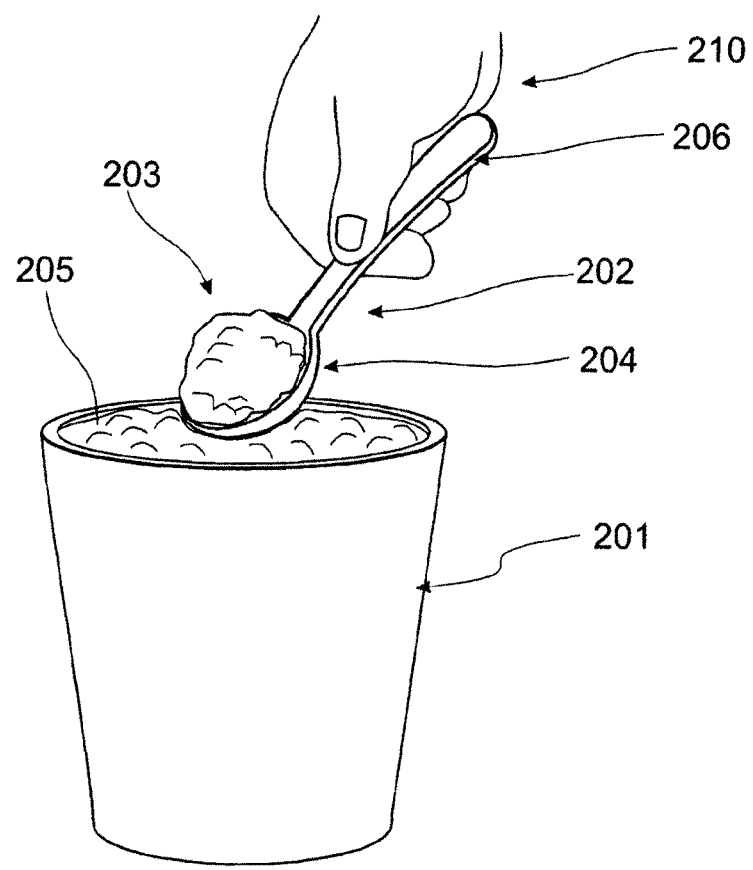
FIG. 31 is a schematic view showing the freezing liquid in a freezing device being stirred, and additional cooled, by a freezing spoon.

FIG. 31 illustrates how the freezing spoon 202 is placed in a cup 201 containing a liquid beverage 205 to be frozen. The heat transfer from the beverage to the frozen external surface s of the spoon bowl 204 enables a frozen slurry to be formed, which the user can consume. The user's hand 210 is protected by the insulated handle 206.

Figure 32:
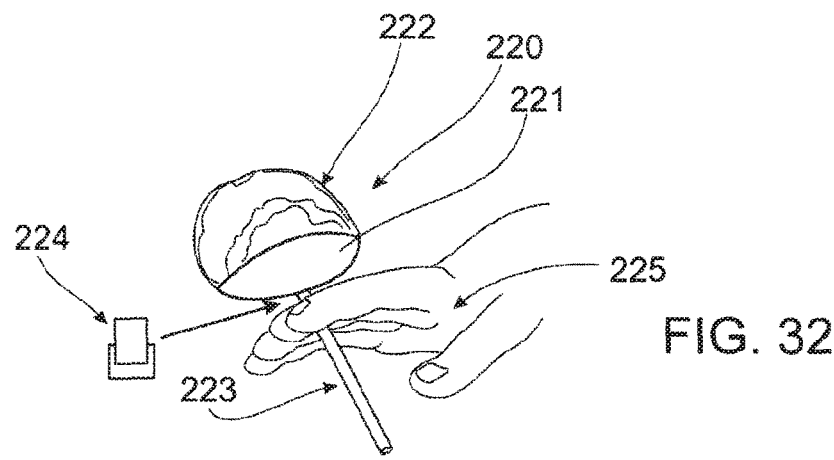
FIG. 32 is a perspective view showing the frozen beverage formed on a stirred with a spherical head.

FIG. 32 illustrates a stirrer 220, where the frozen slurry 222 is formed on a spherical ball 221 connected to an insulated handle 223 by a screw-connection device 224. The insulated handle 223 protects the fingers 225 of the user.

Figure 33:
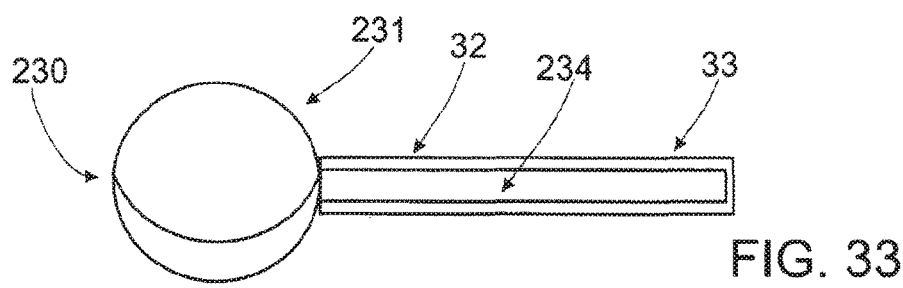
FIGS. 33 and 34 illustrate the stirrer of FIG. 32.
Figure 34:
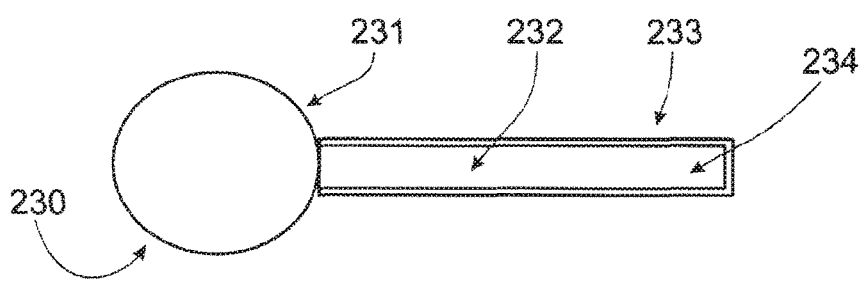

FIGS. 33 and 34 illustrate a further freezing stirrer 230, where a sphere 231 and the handle 232 are filled with refrigerant material 234; where the handle 232 has an insulating cover or sheath 233.

Figure 35:
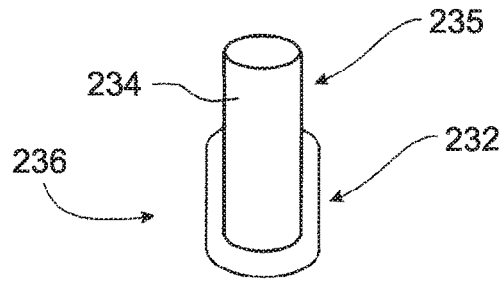
FIG. 35 is a schematic sectional view of an alternative stirrer.

FIG. 35 illustrates a single, tube-like, freezing stirrer 236, with a hollow body 235, filled with refrigerant material 234, having an insulated handle 232.

Figure 36:
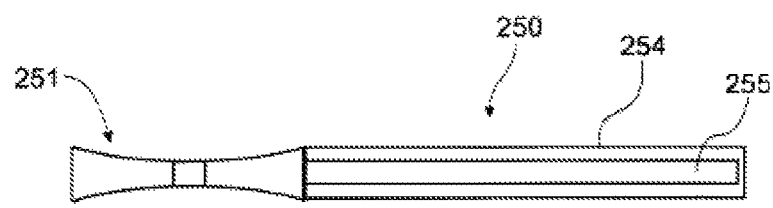
FIG. 36 schematic sectional side view of a spoon-like stirrer.
Figure 37:
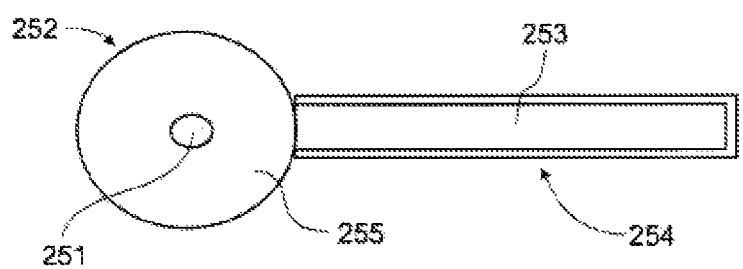
FIG. 37 is a top plan view of the stirrer of FIG. 36.

FIGS. 36 and 37 illustrate a spoon-like freezing stirrer 250, where a annular, bowl-like head 252, has a central hole 251, where the head 252 and the handle 253 are filled with refrigerant material 255. The handle 253 * has an insulated cover 254. The hole 251 in the heads 252 allows any unfrozen liquid to drain back into the container (not shown) before the user brings the stirrer 250, and frozen slurry, to his/her mouth.

Figure 38:
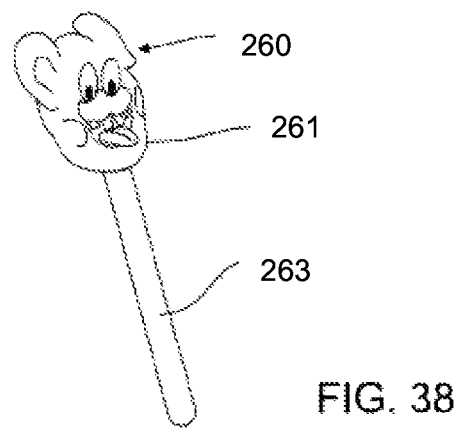
FIG. 38 is a perspective view of a stirrer with a character head.
Figures 39A, 39B, 39C, 39D:
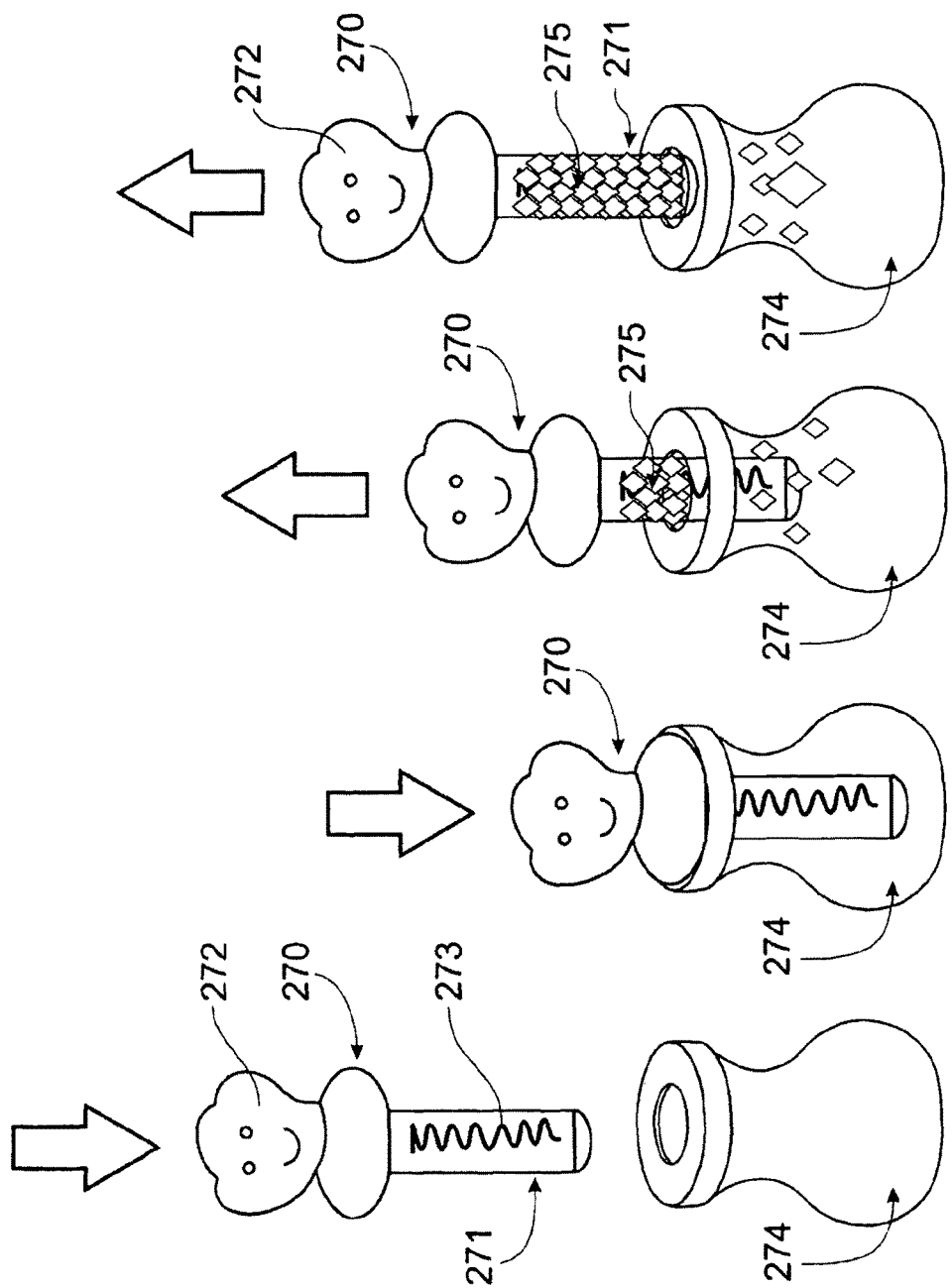
FIGS. 39A to 39D illustrate, a stirrer of the type illustrated in FIG. 38, in use e.g. to freeze a tub of yoghurt.

FIG. 38 illustrates a freezing stirrer 260, where a character-shaped freezing head 261 is covered by frozen slurry (not shown), created by the heat transfer from the liquid in a container to refrigerant material contained within the handle 263 (and, optionally, the freezing head 261).

FIGS. 39A to 39D illustrate the use of a freezing stirrer 270, having a construction as hereinbefore described, where the stirrer 270 has a hollow-body 271, filled with refrigerant material 273, and an insulated character handle 272. The body 271 of the stirrer 270 is dipped into a tub of yoghurt 274 to create a slurry of frozen yoghurt 275 on the body 271.

Figure 40:
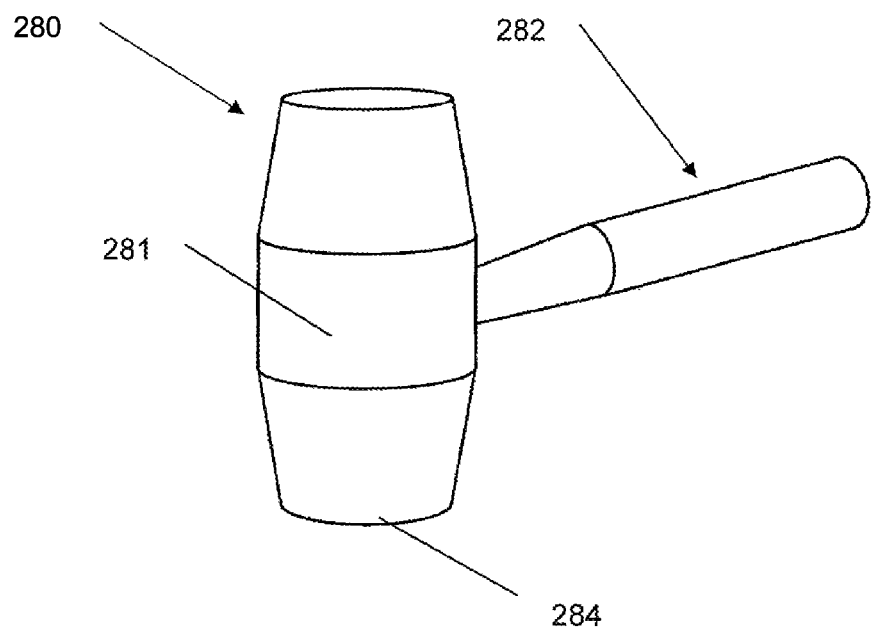
FIG. 40 is a perspective view of a freezer device with a handle.

FIG. 40 illustrates a freezing apparatus 280, where a freezing device containing liquid to be frozen, is placed in a hollow-body 281, provide with a handle 282, the freezing apparatus 280 having the appearance of a hammer or mallet. Gripping the handle 282, the user strikes the end face 284 of the body 281 against a surface (not shown), e.g. a bench or table, to agitate the liquid as it is converted to frozen slurry, in the manner as hereinbefore described.

To manufacture ice cream and similar confections e.g. jelly, greater heat transfer rates are required to reduce the time period for the freezing of the beverage or other confection or food to be consumed.

Referring to FIGS. 41 to 44, and FIGS. 48 to 51, the squeezing apparatus 1010 of a first preferred embodiment has a hollow machine body 1020, e.g. formed of metal- or plastics material, with a top wall 1021 having a hole 1022 therein to provide access to the squeezing compartment 1023 in the machine 1010.

Figure 41:
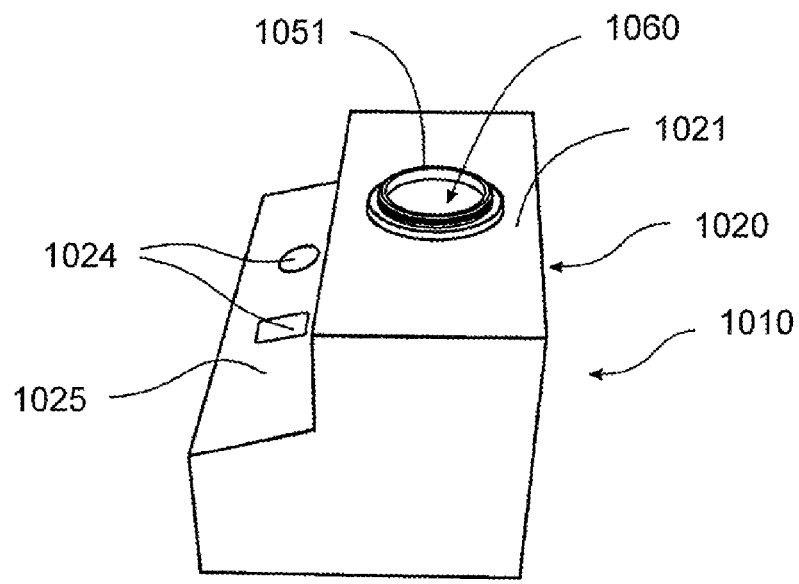
FIG. 41 is a side perspective view of a first embodiment of a freezing apparatus in accordance with the present invention.
Figure 42:
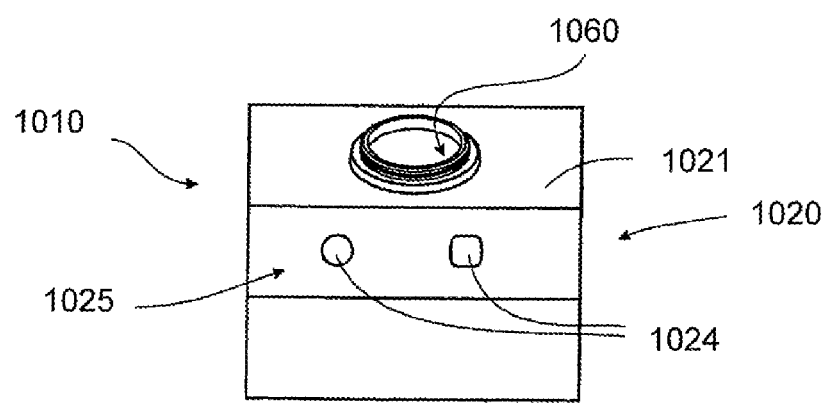
FIG. 42 is a front perspective view thereof.

With regard to FIG. 41, operating controls 1024, e.g. an "On-Off" switch and/or adjustable timer are provided on a control panel 1025 forming an upper portion of the front wall of the machine body 1020. (The operating controls may also include adjustable controls for the distance of travel of the squeezing mechanism and/or the rotational speed of the turning mechanism (both to be hereinafter described) and/or other optional mechanism(s) (to be hereinafter described).

The apparatus 1010 may be either battery- or mains-electrically powered; and the machine body 1020 is preferably tough and easy to clean.

Figure 43:
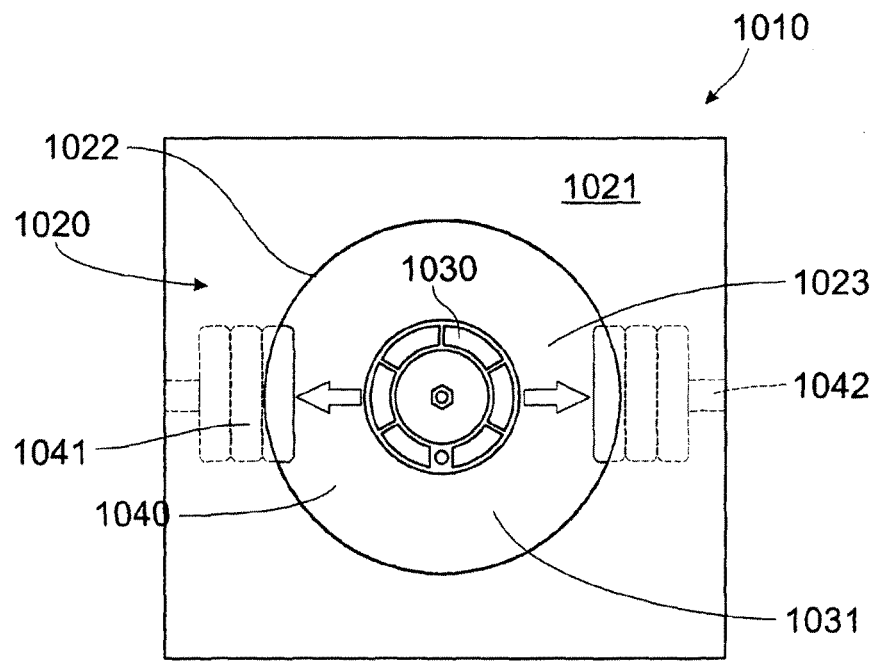
FIG. 43 is a top plan view thereof, with the squeezing mechanism retracted.
Figure 44:
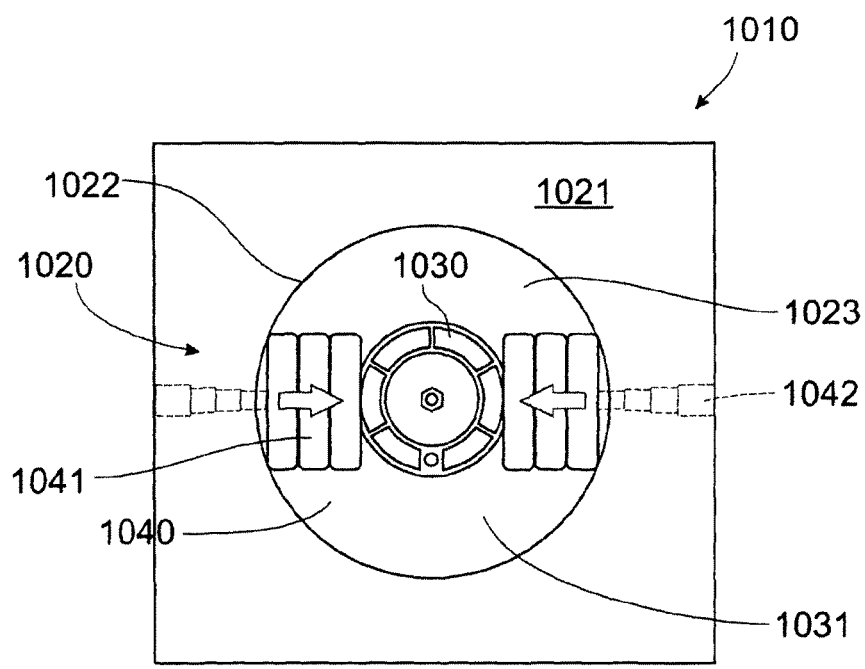
FIG. 44 is a similar view, with the squeezing mechanism extended.

As will be described in more detail with reference to the second embodiment of FIG. 43, a turning mechanism 1030 is mounted at the bottom of the squeezing compartment 1023, co-axially aligned with the hole 1022 in the top wall 1021. The turning mechanism 1030 has a rotary platen (or turntable) 1031 connected, either directly or indirectly, to a variable speed motor (not shown), the motor being controlled by the operating controls 1024 (see FIG. 42).

The squeezing mechanism 1040 in the squeezing compartment 1023 has a pair of jaws (or plates) 1041, which are diametrically-opposed in the squeezing compartment 1023, and are mounted on reciprocating actuators 1042, also controlled by the operating controls 1024.

The turning mechanism 1030 and squeezing mechanism 1040 are operably linked, so that the rotary turntable 1031 will rotate a squeeze cup 1060, placed in the squeezing compartment 1023, through e.g. 30°/45°/60°/90°/120°/180° each time after the squeezing mechanism 1040 has been operated and the squeezing jaws 1041 are in their retracted positions.

As will be hereinafter described, the turntable 1031 and the squeezing jaws 1041 may operate directly on a reusable form of the squeeze cup 1060 (see FIG. 41 and FIG. 42) containing the mixture to be at least semi-frozen; or may operate indirectly on a disposable squeeze cup via a sheath or outer cup 1050 (see FIGS. 41 and 42) received in the squeezing compartment, the sheath or outer cup 1050 receiving a disposable form of the squeeze cup 1060 and being releasably securable to a rim about the mouth of the disposable squeeze cup 1060 via a two-part releasable locking ring assembly 1051, see FIGS. 41 and 46, (which can be cleaned after each use.)

Figure 52:
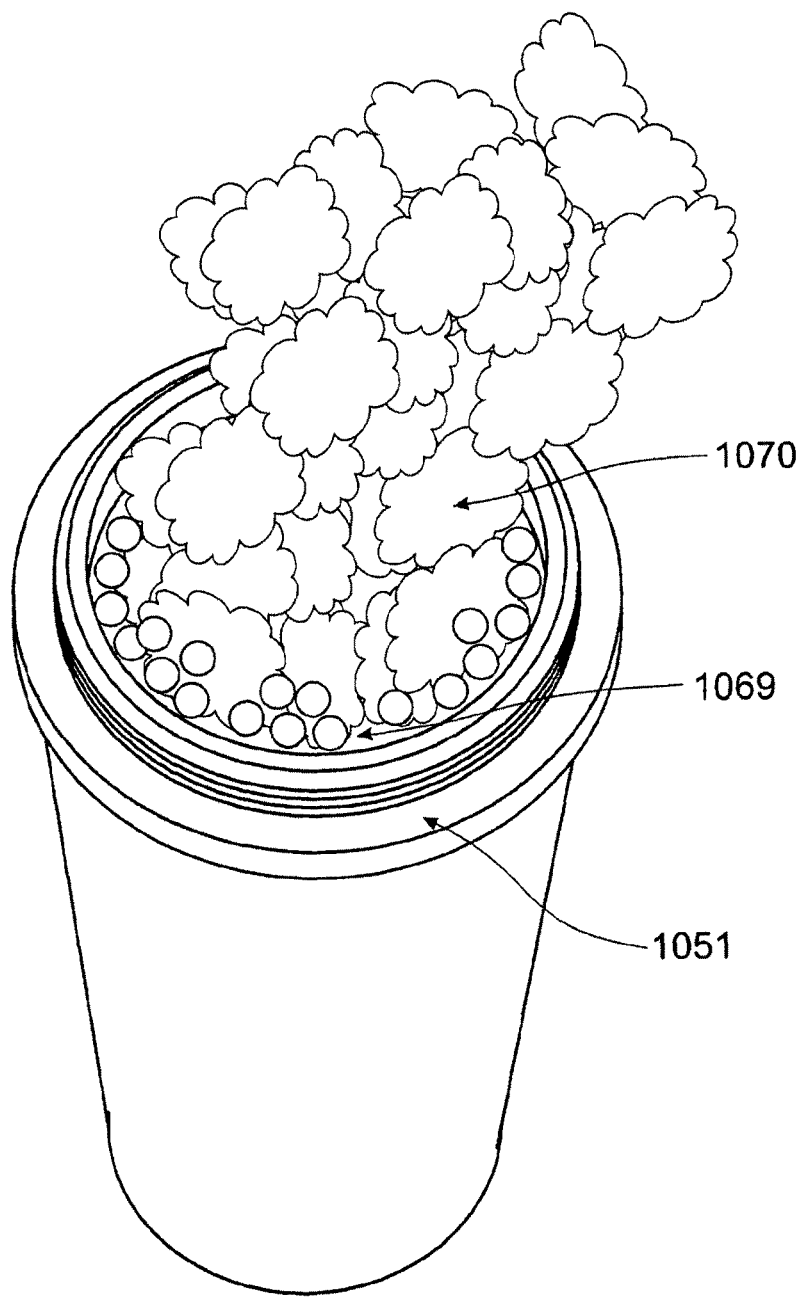
Figure 54:
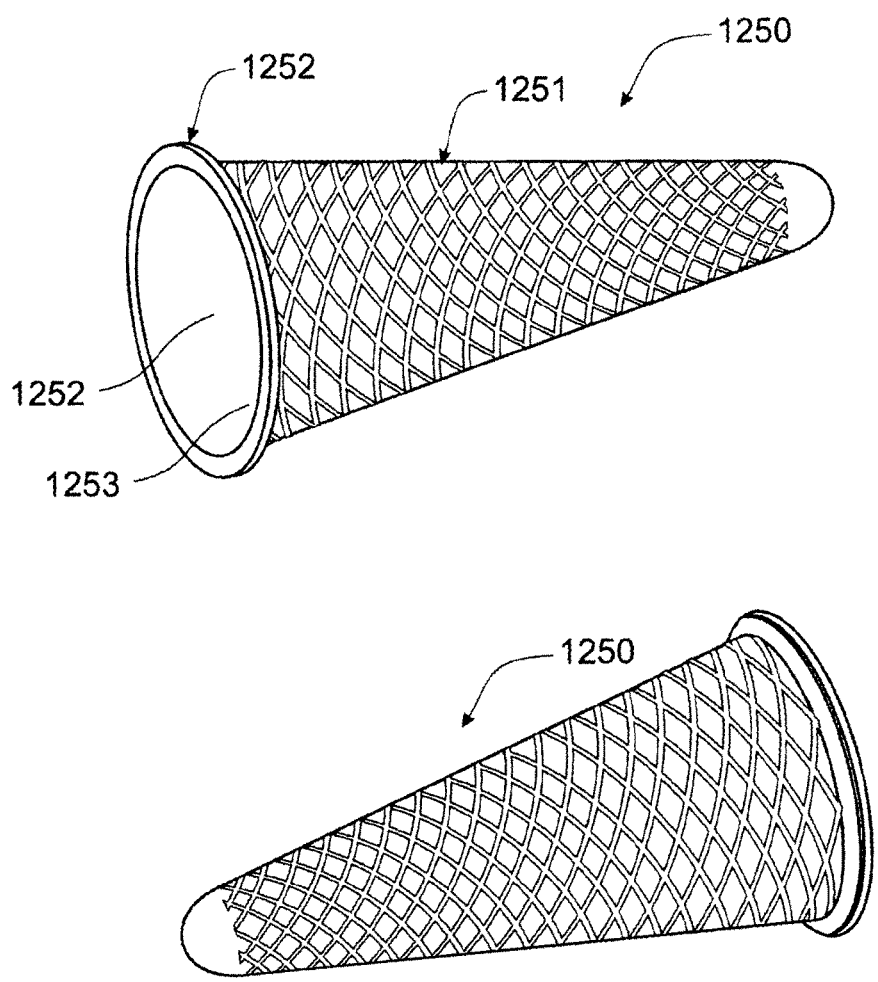
FIG. 54 shows respective top and bottom perspective views of a cone-shaped sheath, or outer cup, for use with the squeezing apparatus.
Figure 55:
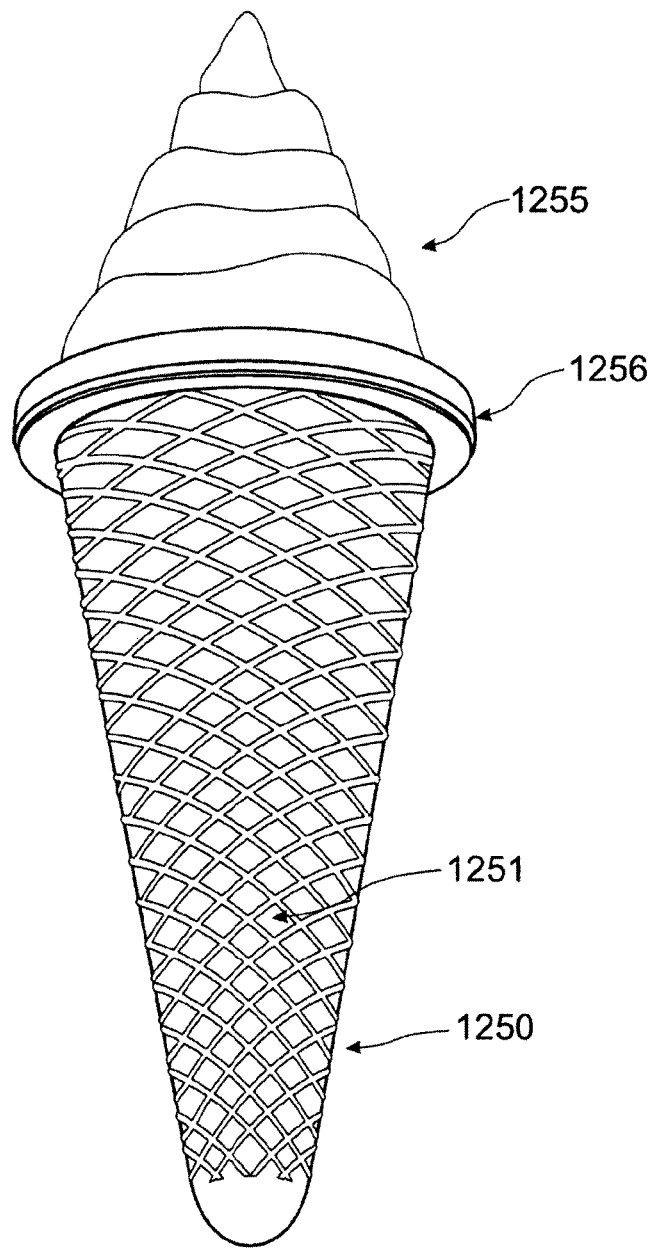
FIG. 55 shows a bottom perspective view of the sheath, or outer cup, provided with an optional removable cover or lid.

The sheath or outer cup 1050 can be cylindrical—see FIG. 52; or conical—see FIGS. 54 and 55; or other suitable shape; and may be formed from e.g. silicone plastics (or the other materials hereinbefore described).

Figure 48:
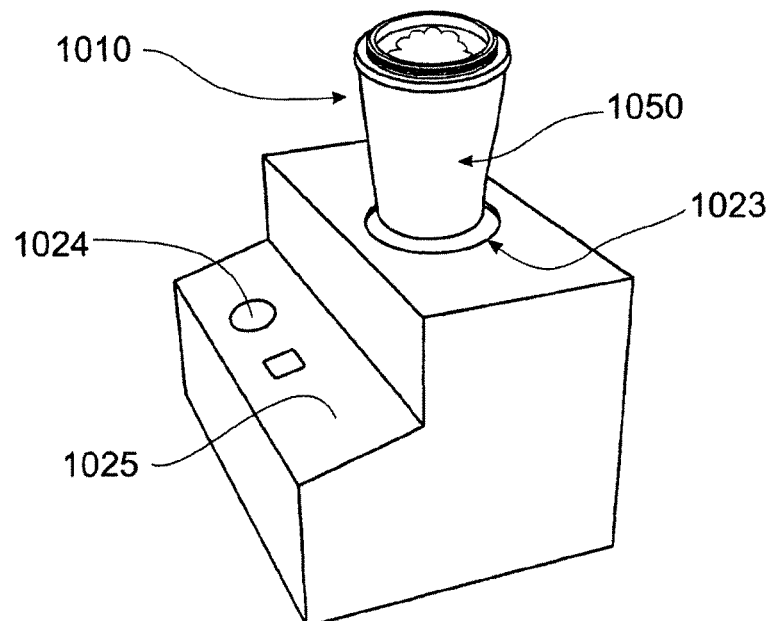
FIGS. 48 to 52 show similar views of the manufacture of the ice cream using the squeezing apparatus.
Figure 49:
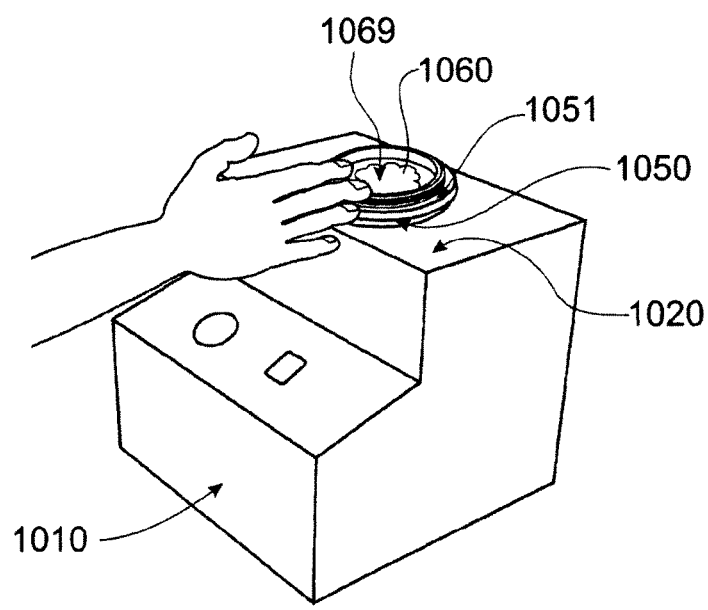
Figure 50:
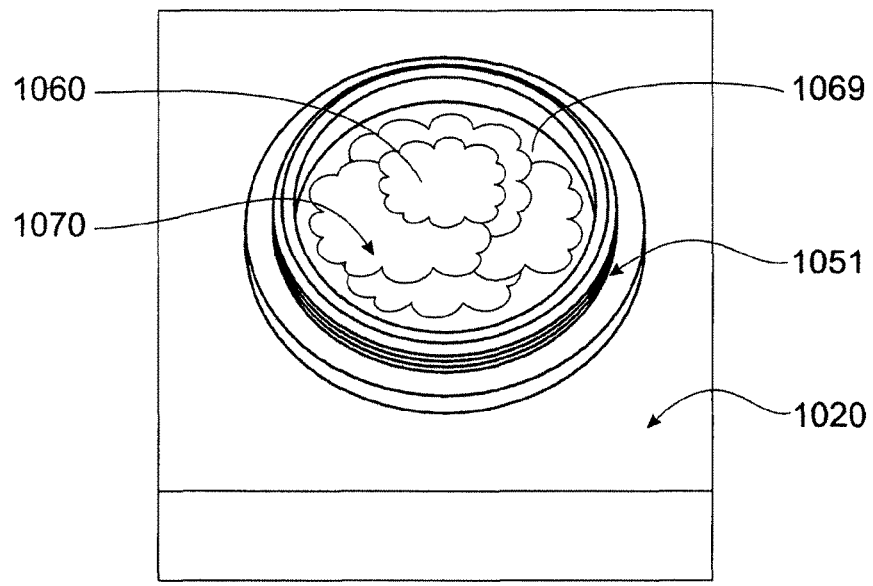

With reference to FIGS. 48 and 49, the squeeze cup 1060, whether as a re-usable cup, or as a disposable cup, can have a shape similar to the sheath 1050. When the squeeze cup 1060 is reusable cup, the outer wall may be formed of e.g. silicone rubber or ethylene vinyl acetate (EVA); while the inner wall may be formed of e.g. thermal polyurethane (TPU); whereas when the squeeze cup 1060 is a disposable cup, both the outer wall and inner wall formed from TPU or like material as hereinbefore described.

The outer and inner walls are sealed together at the rim e.g. by radio frequency welding; and are also welded together, along downwardly extending joints, at spaced locations, to form a plurality of (hollow) columns which form a portion of the refrigerant cavity defined by the outer & inner walls, where the outer and inner bottom walls are not interconnected to form a lower refrigerant cavity portion operably connected to the columns.

A freezing compartment 1069 (see FIGS. 46 and 47) in the squeeze cup 1060 is defined by the inner wall and the mouth.

The refrigerant cavity is partially filled (preferably in the range of 80%-95%) with a refrigerant material, such as brine. Preferably, the volume of the refrigerant material is approximately 60% to 80% of the volume of the liquid to be received in the freezing compartment 1069 (see FIGS. 46 and 47), with the refrigerant material preferably evenly distributed throughout the refrigerant cavity.

By way of example, the at least partially-freeze a carbonated beverage with a volume of 375 mL to 400 mL, there may be 320 mL of refrigerant material provided in the refrigerant cavity.

Figure 45:
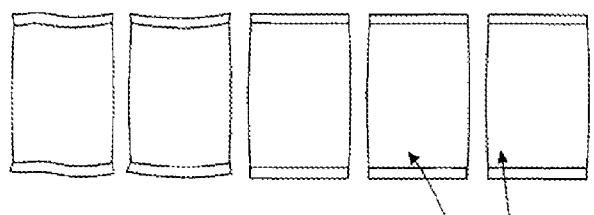
FIG. 45 is a view showing alternative mixes suitable for use in the freezing apparatus.

The ice cream 1070 which is produced using the machine 1010, and squeezing cups 1060, is made from a liquid mixture 1071 comprising water and/or milk (or milk powder), to which is added a flavour mix (or mixture) sold in packs P as illustrated in FIG. 45.

Figure 46:
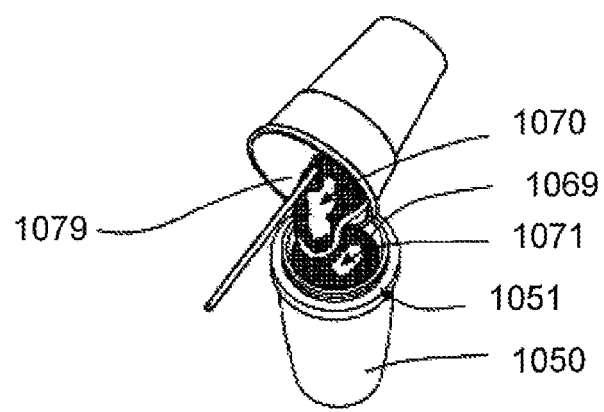
FIG. 46 is a top perspective view showing an ice cream mix being poured into a freezing device, in the form of a squeeze cup, before the squeeze cup is placed in the squeezing apparatus.
Figure 47:
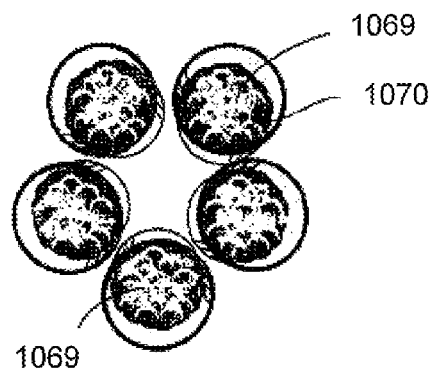
FIG. 47 is a top perspective view of batches of ice cream manufactured in the squeezing apparatus.

As illustrated in FIG. 46, the liquid ice cream mixture 1071 is poured into the disposable squeeze cup 1060 received in the sheath 1050; and after processing in the machine 1010 (see FIGS. 41 and 42), to be hereinafter described, produces ice cream 1070 ready for consumption, as illustrated in FIG. 47. The disposable squeeze cup 1060 will have been taken from a freezer (not shown) where the refrigerant material has been cooled below e.g. −20° C.

As illustrated in FIG. 48, the sheath 1050 and the disposable squeeze cup 1060 (with the liquid ice cream mixture) are placed in the machine 1010, with the major (lower) portion received in the freezing compartment 1023.

Figure 56:
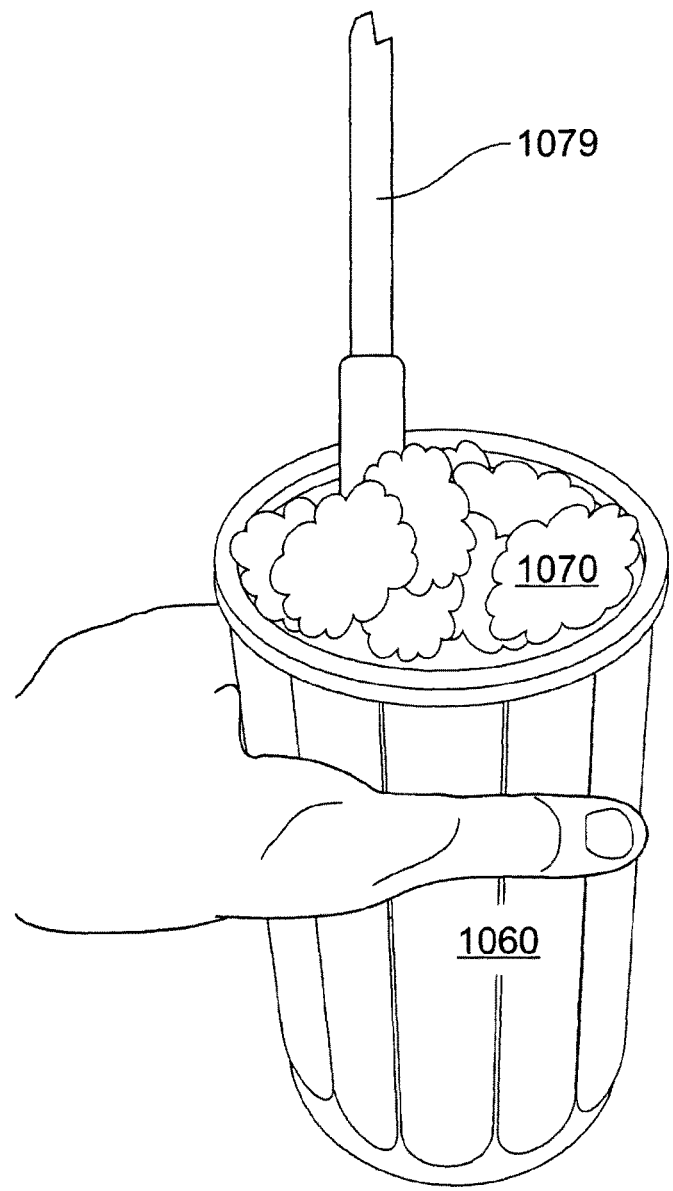
FIG. 56 is a perspective view of a ice cream or iced confection manufactured using the sheath of FIGS. 54 and 55.

The machine 1010 is set into operation/and the squeezing mechanism 1040 and the turning mechanism 1030 are selectively operated so that the sheath 1050/squeeze cup 1060/liquid ice cream mixture 1071 are squeezed/rotated/squeezed/rotated e.g. for 4 minutes (see FIGS. 46 to 52) until the liquid ice cream mixture 1071 has been processed to ice cream, as illustrated in FIGS. 52 and 56.

Figure 51:
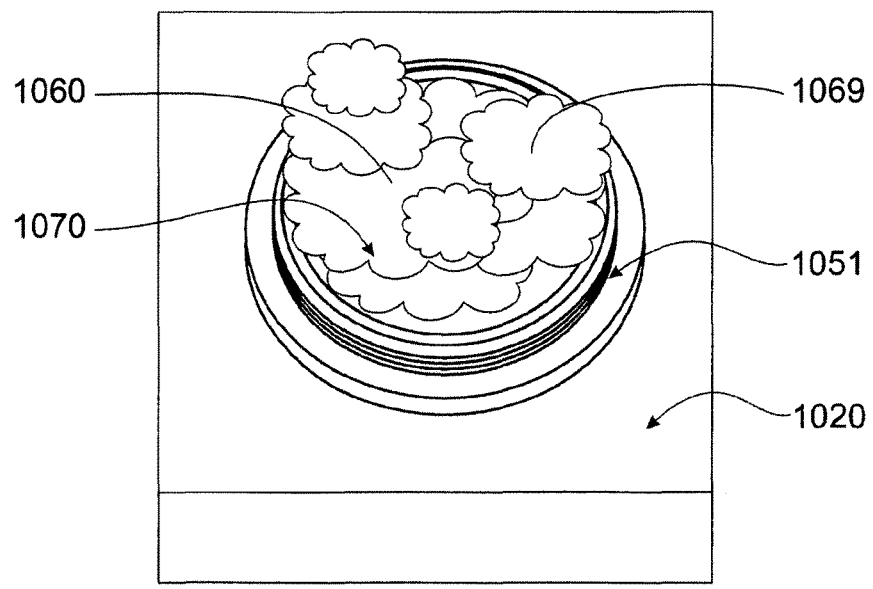

During the operation of the machine 1010, the operator may stir the mixture 1071, as it becomes frozen, with a spoon 1079 (see FIG. 46), to assist in the aeration of the final ice cream 1070, as illustrated in FIG. 51. Alternatively, the mixture may be aerated by a suitable aerator and/or by the addition of a small amount of an ingredient, such as sodium bicarbonate, which enhances the aeration of the liquid.

The sheath 1050 and disposable squeeze cup 1060 are removed from the machine 1010; and the disposable squeeze cup 1060 is withdrawn from the sheath 1050. The sheath 1050 can be cleaned, ready to receive a disposable squeeze cup 1060 with the next liquid ice cream mixture 1071 to be processed. The ice cream 1070 may be consumed directly from the squeeze cup 1060 or be transferred to a container 1069 for consumption.

After the disposable squeeze cup 1060 has been emptied, it can be disposed of e.g. in a waste bin.

When the squeeze cup 1060 is reusable, and the ice cream 1070 have been consumed or placed in another container 1069, the reusable squeeze cup 1060 can be washed, dried, and then placed back in the freezer to refreeze the refrigerant material 1068. If the reusable squeeze cups 1060 are conical in shape, or have tapered walls, they may be nested together in the freezer to reduce storage space.

Figure 53:
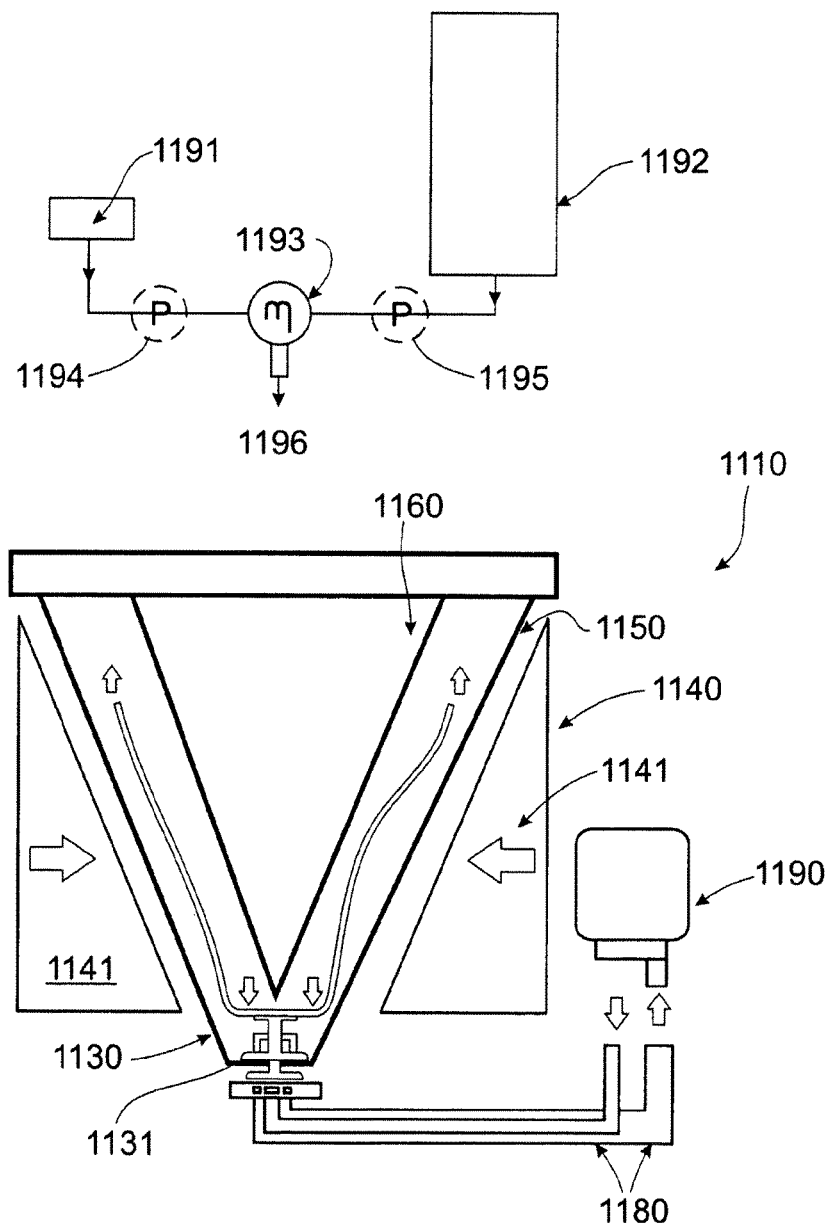
FIG. 53 is a schematic side view of a squeeze cup and a second embodiment of the squeezing apparatus.

FIG. 53 schematically illustrates a second embodiment, showing the disposable squeeze cup 1160 being received in a substantially cylindrical sheath 1150 in the freezing compartment of the machine 1110. The turntable 1131 of the turning mechanism 1130 supports the sheath 1150, which is squeezed inwardly by the jaws 1141 of the squeezing mechanism 1140. The sheath 1150 may be fixed to the turntable 1131, and be sealably connected to the top wall of the body of the machine 1110 to protect the interior of the machine 1110 against leakage of the liquid mixture.

In this embodiment, where the squeezing apparatus 1110 is to be used for production of batches e.g. 5 liters+, the refrigerant material may be circulated via hoses 1180 connected to at least one refrigerant cavity surrounding the freezing compartment, the refrigerant material being cooled, and circulated, by a condenser/heat exchanger/pump assembly 1190.

The liquid to be frozen may be formed by mixing a powder flavour or essence stored in a first tank 1191 and water or milk stored in a second thank 1192, the tanks 1191 and 1192 being connected to a mixer unit 193 (via optional pumps 1194, 1195), where the output 196 supplies the mixture ton the squeeze cup 1160. The mixer unit 1193 may incorporate an aerator, such as a small fan or air pump, which forces a steady stream of ambient air through the liquid as it is being mixed and/or as it is being frozen to increase the volume of the final frozen (ice cream) product (which may be 30% (v/v) to 50% (v/v) of air. Alternatively, a stirrer mechanism may be provided to aerate the liquid as it is frozen.

In alternative embodiments of the squeezing apparatus 1010, 1110, the turning mechanism 1030, 1130 may be omitted; and the apparatus is provide with a pair of the squeezing mechanisms 1040, 1140, arranged at 90°; where the pairs of squeezing mechanisms 1040, 1140 preferably operate alternately to squeeze opposed pairs of side walls of the squeeze cups 1060, 1160. The timing of the actuator(s) for the respective pairs of jaws 1041, 1141, may be controlled by the control system for the apparatus 1010, 1110.

FIGS. 54 and 55 illustrate a sheath 1250 of substantially conical shape, with a side wall 1251 closed at the bottom, and surmounted by a peripheral rim 1252 about a mouth 1253 to the compartment 1254 which receives the disposable squeeze cup. An optional lid 1255 e.g. in the shape of an "ice cream twist", can be secured to the sheath 1250 via a two-part releasable locking assembly 1256 which engages the peripheral rim 1252.

The sheath 1250, which is designed to be reused many times, is manufactured from a "tough" flexible material e.g. silicone rubber or EVA (ethylene vinyl acetate).

The embodiments described and illustrated in FIGS. 41 to 56 are generally directed to the production of ice cream, or other frozen food or beverage, for individual consumption.

Figure 57:
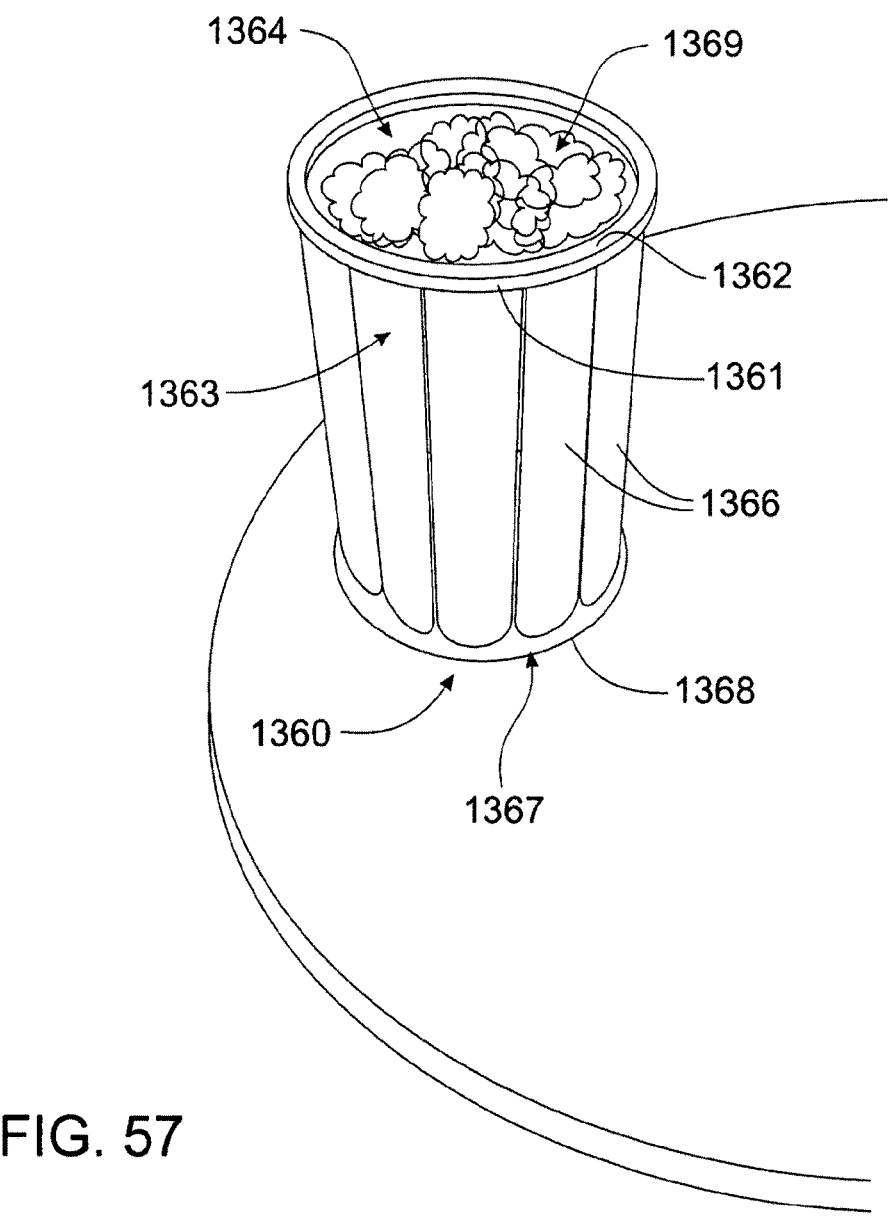
Figure 58:
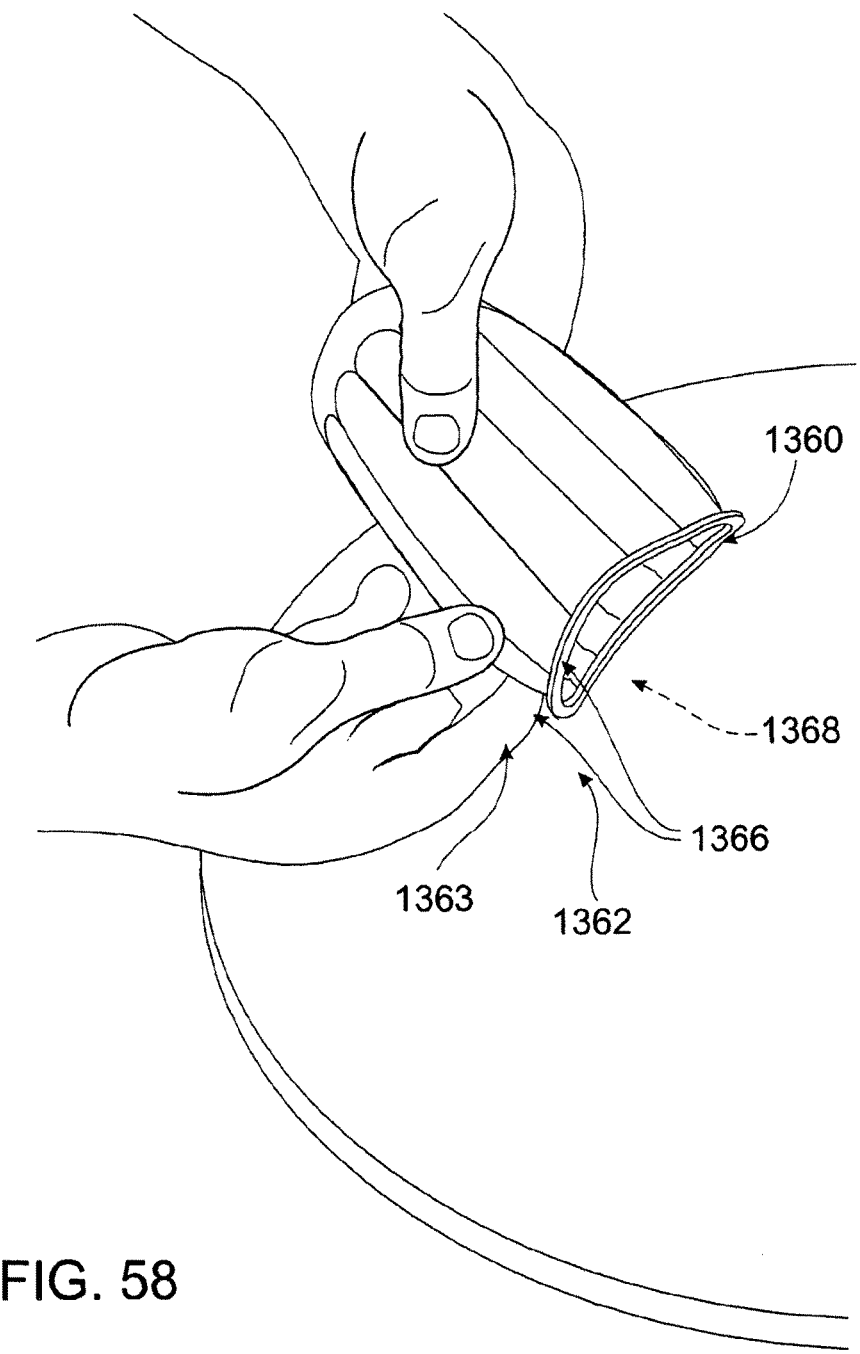
FIG. 58 is a similar view showing the freezer bag being manually squeezed during the manufacturing method.
Figure 59:
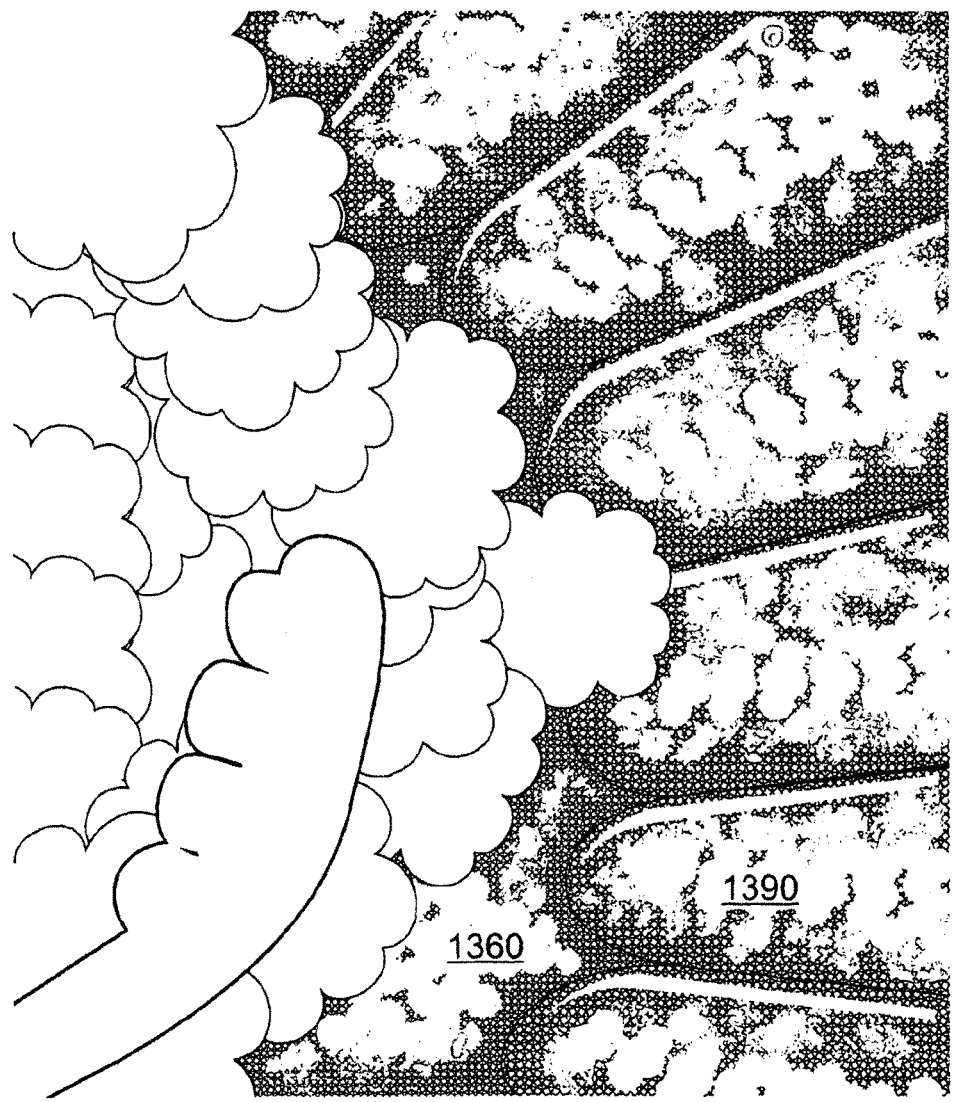
FIG. 59 is a similar view of ice manufactured in the freezer bag of FIGS. 57 and 58.

FIGS. 57 to 59 illustrate a freezer bag 1360 suitable for producing larger volumes per batch.

The freezer bag 1360 is of generally cylindrical shape, with outer and inner walls 1363, 1364 (and outer and inner bottom walls) manufactured from the same materials/in the same manner as for the disposable squeeze cup 1060. The refrigerant cavity 1367 has interconnected (hollow) columns 1366, and contains refrigerant material 1368, as per disposable squeeze cup 1060. The freezing compartment 1369 can be sealably closed by removable and/or releasable clip or slide means which selectively seal the mouth 1362. Alternatively, flexible cover or lid may be used to seal the mouth 1362.

After the refrigerant material 1368 has been frozen in a freezer, the freezer bag 1360 is removed from the freezer; the liquid to be frozen is placed in the freezing compartment 1369; and the mouth 1362 is sealed.

As illustrated in FIG. 59, the operator squeezes the freezer bag 1360 until the heat in the liquid in the freezing compartment is transferred to the refrigerant material 1368, and the liquid is at least semi-frozen to a "slurry" e.g. to produce ice 1390, or other frozen food or beverage, as required.

The ice 1390, which may be flavoured, may be moulded into shape(s) e.g. snowman, ball, in suitable mould(s) not shown.

When the at least semi-frozen slurry has been removed, the freezer bag 1360 can be washed, dried and returned to the freezer for the next batch operation.

It would be possible to design a machine 1010 with a freezing compartment having a capacity to receive, and squeeze, the freezer bag 1360, as in the manner hereinbefore described for the machines 1010, 1110.

Consumers have enjoyed making and consuming coffees (or like beverages) at home, through such products as Nespresso®, whereby many varieties of coffee powders are available in different flavours or coffee blends, with each powder being provided in a plastics- or metal-foil frangible capsule. The capsule for a selected coffee blend is placed in a purpose built coffee machine, and is mixed with water and/or milk, to make a specialized serve of coffee at home.

Similarly, the present invention can provide the same experience and enjoyment as Nespresso® for the making of frozen desserts, slushy drinks, frozen yoghurts, jellies, puddings; and especially ice cream in hard or soft serve form and in a variety of flavours.

In particular, the mixes could be provided in liquid- or powder form in frangible capsules or cartridges; or in a bulk container or tank connected to a mixing chamber in the freezing machine; where the mixing chamber can also draw water and/or milk from suitable storage compartment(s) or tank(s) associated with the machine. The machine could also have an associated freezer unit for the squeeze cups.

The operator would select a flavour, and either place a corresponding flavour mix capsule or cartridge in the machine, or select the flavour from the options available. The operator would take a squeeze cup from the freezer unit and place the squeeze cup in a sheath or outer cup in the freezing compartment of the machine; and commence the freezing cycle (e.g. selecting the squeezing period for the desired consistency of the desired product). The machine would mix the flavour mix released from the capsule or cartridge, or from the bulk container or tank, with the water and/or milk in the mixing chamber; and dispense the liquid mixture into the squeeze cup. The machine then squeezes and rotates the sheath and squeeze cup for the selected period, until the liquid mixture becomes at least semi-frozen. The squeeze cup can be removed and the operation repeated to produce the next consumable product.

The skilled addressee will appreciate that the apparatus of the present invention provides a simple, efficient, cost-effective method for the production of at least semi-frozen foods or beverages of the types hereinbefore described; and the method can be applied to a single product being produced; or be effected by a specialised dispensing/freezing machine; or anywhere in between. The invention also provides machine(s) suitable for affecting the method.

In addition, while a consumer may only purchase a single freezing machine, the sale of the flavour powders or liquids can provide an ongoing source of revenue.

For many years, jelly has been made by mixing powdered gelatine with hot water, which is then cooled in a refrigerator to make Jelly. In the USA, a common product is known as Jell-O®, which is sold in powder form, and which is available in many different colors and flavors.

The jelly product comes in a powder and contains powdered gelatin and flavorings including sugar or artificial sweeteners, such as Equal®. It is dissolved in very hot water, then chilled, and allowed to set. Fruit, vegetables, whipped cream, or other ingredients can be added to make elaborate snacks that can be molded into various shapes. Jell-O® must be refrigerated until served, and once fully set, it is normally eaten with a spoon.

There are also non-gelatin pudding and pie filling products similar to jelly. To make puddings, these are cooked on a stove top with milk, and then either eaten warm or chilled until more firmly set. Jell-O® also has an instant pudding product, which is simply mixed with cold milk and then chilled. To make pie fillings, the same products are simply prepared with less liquid.

The disadvantage of this form of product is the time that it takes to cool the resulting mixture that is placed in a refrigerator to cool. In many cases, this can take up to 6 hours before the heat is removed from the mixture and the jelly has solidified and is formed.

Using the freezing devices of the present invention, the jelly is formed by the quick cooling provided by the invention; and the jelly can be made in 1 to 5 minutes, with- or without squeezing the outside of the flexible cup.

The jelly that is made instantly can be consumed directly from the freezing cup, or turned upside down and removed from the freezing cup or other container for immediate consumption or storage.

The freezing cup can be washed for re-use; or be disposed of. The re-usable version of the freezing cup can be placed back in the freezer for re-use.

To make the jelly, it is preferred that the refrigerant cavity, or cavities, of the freezing cup or container is filled with an antifreeze freeze.

The volume of the antifreeze mix is in the range of 60% to 00% of the total volume of the cup; and the preferred volume is 66% percent of the total volume. If more antifreeze (saline) is provided, then more freezing potential is available, which means more jelly mixture (at boiling temperature) can be added to the cup to be frozen.

Another preferred antifreeze mix uses a mix of water at 87% (v/v) and Food Grade Propylene Glycol and Sodium Chloride (Salt) Composite mix at 13% (v/v).

During manufacture of the freezing cup, when the void is filled with * the antifreeze mix, any excess air is purged out and a semi-vacuum is formed in the refrigerant cavity.

The freezer cup is frozen by refrigeration or cryogenic means. Once the antifreeze in the cup is frozen, the cup is filled with a jelly mixture by pouring the hot liquid into the top of the cup.

At this time, or during the pouring, the freezing cup can be agitated mechanically or manually by squeezing, shaking, vibrating, rotating or similar means, to agitate the mixture and convert the jelly mixture into a consumable jelly or other confectionery in a short period of time. This time can be as low as 15 seconds; but 60 seconds to 180 seconds is the average when the antifreeze mix is fully frozen at −20° C. and the jelly mixture is initially at 100° C.

Once the hot liquid is converted into a jelly, the product can be placed in refrigerated storage or be consumed immediately.

The time taken to create the jelly (or any other frozen product) is dependent on the quantity, type and temperature of the liquid to be frozen and the overall percentage that is desirable to be frozen.

In another preferred embodiment, not illustrated, the freezing cup or container is formed from either a roll of plastic, cardboard or aluminium sheet, that is folded and thermally welded to form the freezing container that is then filled with the antifreeze of salt and soft drink, or salt and water.

In another alternative embodiment, the freezing containers are formed as individual flat packs, which are then manually- or machine-folded and thermally-joined or welded to create the container that can be easily filled and sealed by a beverage filling and sealing machine to finish the product manufacture.

The skilled addressee will readily appreciate that the present invention provides methods of, and apparatus for, the production of a wide range of frozen (or semi-frozen) beverages, confections or foods, on either a single-user scale to at least semi-commercial production scale, simply, efficiently and inexpensively.

It will be readily apparent to those skilled in the art that various changes and modifications can be made to the embodiments described and illustrated without departing from the present invention

The invention claimed is:

1. An apparatus for converting a liquid into an at least partially frozen form including:
an outer container, and
a freezing device receivable within said outer container, the freezing device being at least partially filled with a refrigerant material and configured to define a compartment into which the liquid is to be received, the refrigerant material being able to be cooled below a freezing temperature of the liquid;
wherein, both of said outer container and said freezing device are deformable to promote contact between the liquid and the freezing device and facilitate conversion of said liquid into the at least partially frozen form,
wherein the freezing device includes a peripheral rim around an inner mouth, wherein upper portions of an outer wall and an inner wall of the freezing device are sealed together, and
wherein the outer container includes an outer mouth which has a peripheral flange, wherein the peripheral rim of the freezing device is secured to the peripheral flange and includes at least one stabilizing ring configured to limit deformation of the inner mouth and the outer mouth when the outer container and the freezing device are deformed.

2. The apparatus of claim 1, wherein:
the freezing device includes the outer wall and the inner wall sealably connected together to form at least one refrigerant cavity.

3. The apparatus of claim 1, wherein:
the freezing device includes the outer wall and the inner wall sealably connected together to form a plurality of refrigerant cavities, the outer wall and the inner wall each has an upper end and a lower end, and the plurality of refrigerant cavities extend between the upper end and the lower end.

4. The apparatus of claim 3, wherein:
the plurality of refrigerant cavities is formed by a plurality of columns around the inner wall.

5. The apparatus of claim 4, wherein:
the plurality of columns are semi-closed.

6. The apparatus of claim 5, wherein:
the plurality of columns are open on at least one of the lower end and the upper end of the freezing device.

7. The apparatus of claim 4, wherein:
each of the columns has one of a semi-circular, triangular, and convex shape, inwardly directed towards the freezing compartment.

8. The apparatus of claim 4, wherein:
a longitudinal axis of each of the columns lies parallel with a central axis of the freezing device.

9. The apparatus of claim 1, wherein:
the freezing device includes a base wall.

10. The apparatus of claim 1, wherein:
the outer container comprises an insulating material chosen from foam, rubber, silicone rubber, EVA and thick plastics;
the freezing device is manufactured from one of a flexible plastic, flexible aluminum, and flexible composite material; and
the refrigerant material is an antifreeze mix chosen from water mixed with at least one of salts, sugar, alcohols, propylene glycol and calcium chloride.

11. The apparatus of claim 1, wherein:
the freezing device is configured as one of a cup, can, tub and cone and the outer container has the configuration of one of a cup, can and cone.

12. The apparatus of claim 1, wherein:
the freezing device and the outer container each has a cylindrical configuration which tapers inwardly towards a lower end of the freezing device and the outer container, respectively.

13. An apparatus for converting a liquid into an at least partially frozen form including:
an outer container, and
a freezing device including an inner mouth, wherein upper portions of an outer wall and an inner wall of the freezing device are sealed together and the liquid is able to be poured into the inner mouth, the freezing device being receivable within said outer container, the freezing device further being at least partially filled with a refrigerant material being able to be cooled below a freezing temperature of the liquid;
wherein, both of said outer container and said freezing device are deformable to promote contact between the liquid and the freezing device and facilitate conversion of said liquid into the at least partially frozen form;
wherein the freezing device includes a peripheral rim around the inner mouth, and said peripheral rim includes at least one stabilizing ring configured to limit deformation of the inner mouth when the freezing device is deformed; and
wherein the outer container includes an outer mouth which has a peripheral flange secured to the peripheral rim.

14. The apparatus of claim 13, wherein: the stabilizing ring forms a portion of the peripheral rim and a locking assembly secures the peripheral rim of the freezing device to the peripheral flange of the outer container.

15. The apparatus of claim 14, wherein: the locking assembly includes a first ring engageable with the peripheral flange and a second ring engageable, directly or indirectly, with the peripheral rim.

16. The apparatus of claim 15, wherein: the locking assembly secures a lid or a cover.

17. The apparatus of claim 15, wherein: the locking assembly includes a third ring to limit deformation of the inner mouth of the freezing device and the outer mouth of the outer container when the freezing device is deformed.

18. The apparatus of claim 13, wherein the freezing device includes the outer wall and the inner wall sealably connected together to form a plurality of refrigerant cavities, the outer wall and the inner wall each has an upper end and a lower end, and the plurality of refrigerant cavities extend between the upper end and the lower end; the plurality of refrigerant cavities is formed by a plurality of columns around the inner wall.

19. The apparatus of claim 18, wherein the plurality of columns are semi-closed.

20. The apparatus of claim 18, wherein the plurality of columns are open on at least one the lower end and the upper end of the freezing device.

21. The apparatus of claim 18, wherein each of the columns has one of a semi-circular, triangular, and convex shape, inwardly directed towards the freezing compartment.

22. The apparatus of claim 13, wherein the freezing device includes a base wall.

\* \* \* \* \*